(12) United States Patent
Sage et al.

(10) Patent No.: US 12,005,364 B2
(45) Date of Patent: Jun. 11, 2024

(54) DETECTABLE PROJECTILE SYSTEM WITH INTERACTIVE SHOOTING GAME METHODS

(71) Applicant: Hasbro, Inc., Pawtucket, RI (US)

(72) Inventors: Phillip Llewellyn Sage, Barrington, RI (US); James Edward Brown, Jr., Pawtucket, RI (US); Dan Luther, Providence, RI (US); Wouter Reeskamp, Amsterdam (NL); Tal Amram, Utrecht (NL); Tijn Martinus Maria Kooijmans, Amsterdam (NL)

(73) Assignee: Hasbro, Inc., Pawtucket, RI (US)

( * ) Notice: Subject to any disclaimer, the term of this patent is extended or adjusted under 35 U.S.C. 154(b) by 0 days.

(21) Appl. No.: 17/501,904

(22) Filed: Oct. 14, 2021

(65) Prior Publication Data
US 2022/0118353 A1     Apr. 21, 2022

Related U.S. Application Data

(60) Provisional application No. 63/092,568, filed on Oct. 16, 2020.

(51) Int. Cl.
| | |
|---|---|
| *A63F 9/02* | (2006.01) |
| *A63F 9/00* | (2006.01) |
| *A63H 33/26* | (2006.01) |
| *H04W 4/80* | (2018.01) |

(52) U.S. Cl.
CPC ............ *A63F 9/0252* (2013.01); *A63F 9/001* (2013.01); *A63F 9/0278* (2013.01); *A63H 33/26* (2013.01); *H04W 4/80* (2018.02); *A63F 2009/0023* (2013.01); *A63F 2250/025* (2013.01); *A63F 2250/49* (2013.01)

(58) Field of Classification Search
CPC .......... A63F 9/02; A63F 9/0252; A63F 9/001; A63F 2009/0023; A63F 2250/025; A63F 2250/49; A63H 33/26
USPC ........................................................ 273/317
See application file for complete search history.

(56) References Cited

U.S. PATENT DOCUMENTS

| | | |
|---|---|---|
| 3,487,226 A | 12/1969 | Yetter et al. |
| 3,790,948 A | 2/1974 | Ratkovich |
| 3,807,858 A | 4/1974 | Finch |
| 3,948,522 A | 4/1976 | Fixler |
| 4,065,753 A | 12/1977 | Paul, Jr. |

(Continued)

FOREIGN PATENT DOCUMENTS

| | | |
|---|---|---|
| KR | 2016-0122924 A | 9/2016 |
| WO | WO2005074567 A2 | 8/2005 |

OTHER PUBLICATIONS

PCT/US21/55075 ISR Transmittal, Written Opinion, and ISA Search 1-764 PCT papers dated Feb. 14, 2022.

*Primary Examiner* — Joseph B Baldori
(74) *Attorney, Agent, or Firm* — Perry Hoffman

(57) ABSTRACT

Disclosed are toy battle dart shooting gameplay environments supporting players' dart projectile hits or tags with detectable projectile devices, systems, and methods for resolving hits to a targeted player from a toy projectile during gameplay. In certain configurations interactive shooting battling provide arrangements are between players individually or within an arena architecture facilitated Targeted Player Hit Resolution via data communications with detectable projectiles and interactive shooting systems and methods.

14 Claims, 34 Drawing Sheets

(56) References Cited

U.S. PATENT DOCUMENTS

| | | | |
|---|---|---|---|
| 4,798,389 A | 1/1989 | Long | |
| 5,195,752 A | 3/1993 | Reeves et al. | |
| 5,564,698 A | 10/1996 | Honey et al. | |
| 5,599,025 A | 2/1997 | Pobee-Mensah | |
| 5,636,378 A | 6/1997 | Griffith | |
| 5,649,706 A | 7/1997 | Treat, Jr. et al. | |
| 5,698,815 A | 12/1997 | Ragner | |
| 5,704,612 A | 1/1998 | Kelly et al. | |
| 5,904,621 A | 5/1999 | Small et al. | |
| 6,243,491 B1 | 6/2001 | Andersson | |
| 6,302,796 B1 | 10/2001 | Lebensfeld et al. | |
| 6,422,911 B1 | 7/2002 | Grzesek | |
| 6,604,946 B2 | 8/2003 | Oakes | |
| 6,669,601 B2* | 12/2003 | Marciano | A63B 71/10 482/84 |
| 6,679,180 B2 | 1/2004 | Warnagiris et al. | |
| 6,764,420 B2 | 7/2004 | Cyr et al. | |
| 6,863,532 B1 | 3/2005 | Ambrosoli | |
| 7,100,514 B2 | 9/2006 | LeBourgeois | |
| 7,306,523 B1 | 12/2007 | Jeffway, Jr. et al. | |
| 7,316,625 B2 | 1/2008 | Takahashi | |
| 7,428,994 B1 | 9/2008 | Jeffway, Jr. et al. | |
| 7,658,688 B2 | 2/2010 | Weidner | |
| 7,775,918 B2 | 8/2010 | Tsang | |
| 7,872,849 B2* | 1/2011 | Elliott, Jr. | F41G 3/2627 361/232 |
| 7,905,488 B2 | 3/2011 | Fulgham | |
| 8,075,430 B1 | 12/2011 | Hester | |
| 8,105,087 B2 | 1/2012 | Valentini | |
| 8,234,070 B2 | 7/2012 | McNelis et al. | |
| 8,275,571 B2 | 9/2012 | McNelis | |
| 8,325,020 B2 | 12/2012 | Izadi et al. | |
| 8,366,525 B2 | 2/2013 | Jensen | |
| 8,399,817 B1 | 3/2013 | Rayms-Keller et al. | |
| 8,469,824 B1 | 6/2013 | Farley et al. | |
| 8,523,185 B1 | 9/2013 | Gilbreath et al. | |
| 8,598,501 B2 | 12/2013 | Meyer et al. | |
| 8,611,828 B2 | 12/2013 | Richter et al. | |
| 8,678,877 B2 | 3/2014 | Corlett et al. | |
| 8,706,440 B2 | 4/2014 | McNelis et al. | |
| 8,864,609 B2 | 10/2014 | Kodama et al. | |
| 8,926,395 B2* | 1/2015 | Zheng | A63H 3/28 446/268 |
| 8,939,136 B2 | 1/2015 | Gaus et al. | |
| 9,004,976 B2 | 4/2015 | Rosenberg | |
| 9,011,223 B2 | 4/2015 | Jensen | |
| 9,027,541 B2 | 5/2015 | Huebl | |
| 9,028,312 B1 | 5/2015 | Wei et al. | |
| 9,033,710 B2 | 5/2015 | Quail et al. | |
| 9,067,127 B2 | 6/2015 | Clark | |
| 9,265,991 B2 | 2/2016 | Hohteri | |
| 9,358,443 B2* | 6/2016 | Morehouse | A63B 69/02 |
| 9,364,741 B2 | 6/2016 | Rosenberg | |
| 9,429,397 B1 | 9/2016 | Hill | |
| 9,489,949 B2 | 11/2016 | Tamir et al. | |
| 9,631,106 B2 | 4/2017 | Maaninen et al. | |
| 9,684,010 B2 | 6/2017 | Romashkin | |
| 9,751,002 B2 | 9/2017 | Frank | |
| 9,759,530 B2 | 9/2017 | Miller | |
| 9,900,058 B2 | 2/2018 | Jaakkola et al. | |
| 10,060,712 B2 | 8/2018 | Weiland et al. | |
| 10,080,959 B2 | 9/2018 | Schumacher | |
| 10,099,117 B2* | 10/2018 | Cohen | A63F 13/21 |
| 10,159,884 B2 | 12/2018 | Thurman | |
| 10,281,251 B2 | 5/2019 | Jackson | |
| 10,458,758 B2 | 10/2019 | Miller et al. | |
| 11,029,123 B1 | 6/2021 | Andersen | |
| 11,305,179 B1* | 4/2022 | Wadman | G06E 1/00 |
| 2004/0017178 A1 | 1/2004 | Chang | |
| 2005/0186884 A1 | 8/2005 | Evans | |
| 2005/0231362 A1 | 10/2005 | Pridmore et al. | |
| 2006/0244612 A1 | 11/2006 | Pridmore et al. | |
| 2008/0194337 A1 | 8/2008 | Jensel | |
| 2009/0194943 A1 | 8/2009 | Amitai et al. | |
| 2010/0035709 A1 | 2/2010 | Russell et al. | |
| 2010/0324859 A1 | 12/2010 | McNelis et al. | |
| 2012/0146770 A1 | 6/2012 | Brannen et al. | |
| 2012/0256731 A1 | 10/2012 | Luciano, Jr. et al. | |
| 2013/0176175 A1 | 7/2013 | Zusman et al. | |
| 2013/0220160 A1 | 8/2013 | Burdine et al. | |
| 2014/0324198 A1 | 10/2014 | Aubouy | |
| 2015/0265917 A1 | 9/2015 | Chang et al. | |
| 2015/0278263 A1 | 10/2015 | Bowles et al. | |
| 2016/0180532 A1 | 6/2016 | Katramados | |
| 2016/0209173 A1 | 7/2016 | Dribben | |
| 2018/0306560 A1 | 10/2018 | Salisbury, Jr. et al. | |
| 2019/0063882 A1 | 2/2019 | Brockel | |
| 2019/0358514 A1 | 11/2019 | Kersteman | |

* cited by examiner

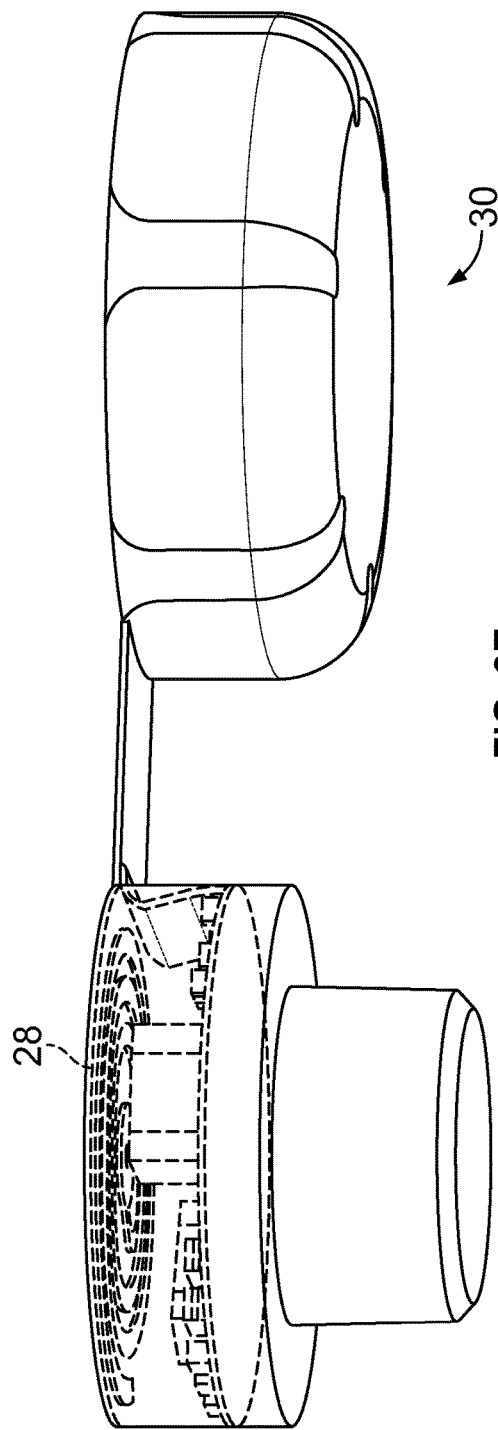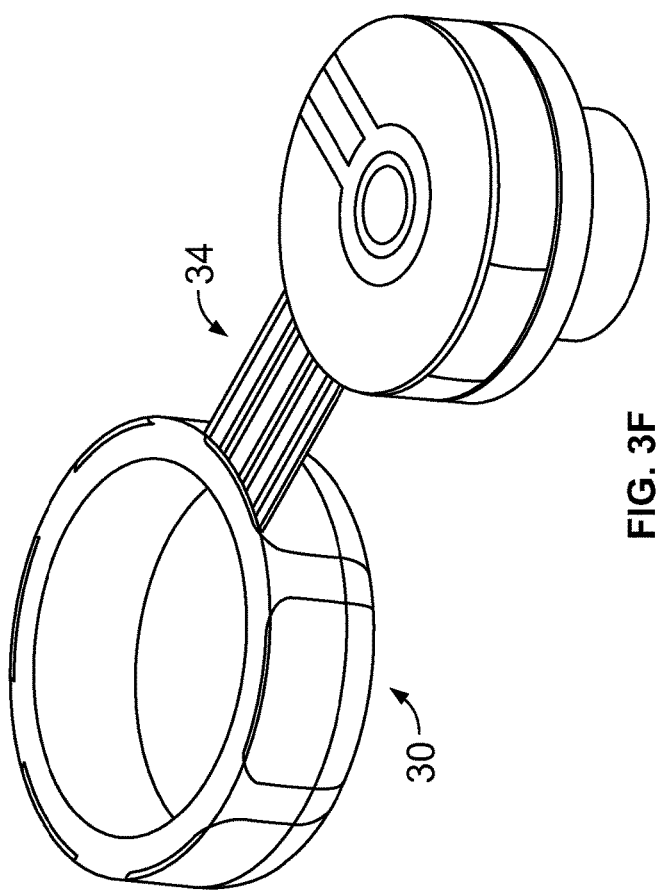
FIG. 3E
FIG. 3F

Dart 4 always goes asleep to conserve power UWB is always sending beacon including information of ID; Blaster 7 receiver pointed in direction of Beacon sends information to Cloud:

1) Blaster 7 is pointed/aimed at Suit 12
2) Time of Pointing by Blaster 7 is Known
3) We know distance between blaster 7 and Suite 12
4) UWB used for distance/proximity of blaster 7 (Rx determination)

DETECTABLE PROJECTILE SYSTEM WITH INTERACTIVE SHOOTING GAME METHODS

PRIORITY CROSS-REFERENCE TO RELATED APPLICATION

This application claims priority pursuant to 35 U.S.C. 119(e) or 120 from U.S. Provisional Application No. 63/092,568 filed Oct. 16, 2020, for inventions disclosed therein.

BACKGROUND OF THE INVENTION

The present invention relates generally to interactive games, and more particularly to game scenarios such as reliably detect a dart, hitting a person, fired from a blaster, from multiple angles. Then tracking how many times they have been hit for gameplay purpose used with mobile electronic devices including dart launchers with hit point accumulation.

Gameplay of the described novel embodiments facilitates player identification with hit point accumulation, with reference to 'player identification' further identifying the player and what team the player was assigned to; the identity of the specific player darts in their magazine/blaster, and other gameplay assignments. Further embodiments of the invention herein allow for identifying an opposite player, identifying a friendly (same team) player, identifying a player who has been hit, identifying who statistically, based on the data traffic being received from the players, is the hot shot, the worst preforming player, and the like.

The features and advantages of the present inventions will be explained in or apparent from the following description of the embodiments considered together with the accompanying drawings.

SUMMARY OF THE INVENTION

The present inventions address the deficiencies of the prior art by defining certain configurations for systems and methods employing interactive shooting battling with arrangements as between players individually or within an arena architecture supporting Targeted Player Hit Resolution through communications as between interactive detectable smart projectiles, players and smart blasters for resolving hits to a targeted player from a toy projectile during gameplay with conductive suits worn by respective players. A first player projectile launcher receives and launches the toy projectiles for use by the first player directed to a second conductive suit worn by the targeted player.

BRIEF DESCRIPTION OF THE DRAWINGS

The inventions will now be more particularly described by way of example with reference to the accompanying drawings, the advantages of which may be best understood with reference to the following detailed description taken in conjunction with the drawing figures, in which:

FIGS. 3A through 3J further illustrate Smart Dart/Smart Tips design configurations, methodology and assembly implementing designs of FIGS. 2A-2C with PCB fabricated electronics, for powered or capacitive projectiles and sensors disclosed, sensors in accordance with the present inventions;

Figure 1:
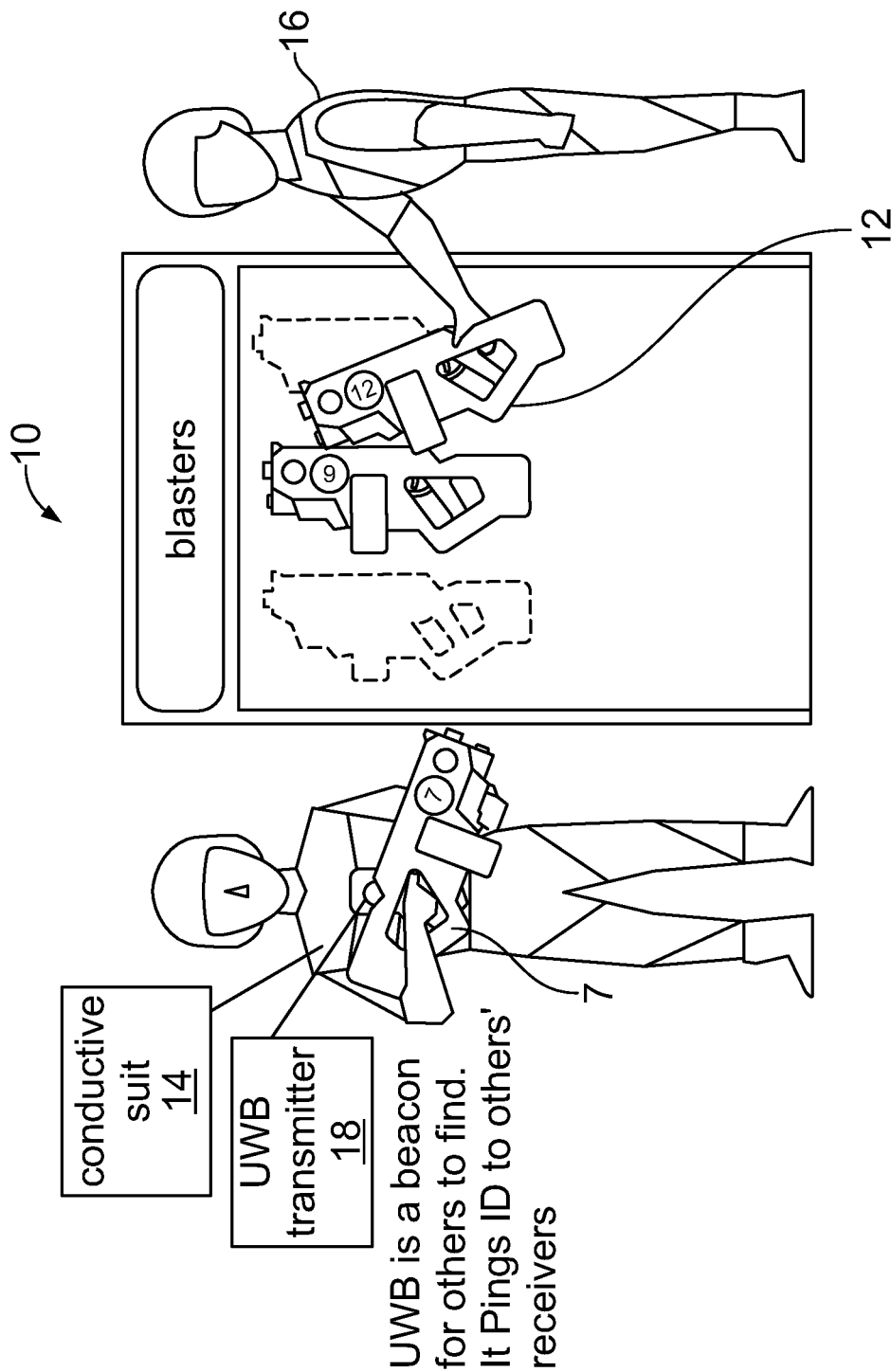
FIG. 1 shows an exemplary toy battle environment which may be provided at a gameplay arena showing Players as wearing Conductive Material/Ultra-Wide Band (UWB) transmitter embedded blaster and selecting blasters from a blaster stand or storage for their individual use in accordance with various embodiments of the present inventions.

The present invention is further described with reference to the accompanying drawings, which show preferred embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

DETAILED DESCRIPTION OF THE EMBODIMENTS

The following description is provided to enable those skilled in the art to make and use the described embodiments set forth in the best modes contemplated for carrying out the invention. Various modifications, however, will remain readily apparent to those skilled in the art. Any and all such modifications, equivalents, and alternatives are intended to fall within the spirit and scope of the present invention.

With reference to FIG. 1, Players are shown as wearing conductive suits and selecting blasters from a blaster stand or storage for their individual use; blasters 7, 9 and 12 shown therein. In alternative basic arrangements where the Targeted Player's blaster itself performs Hit Resolution without server communications, such Targeted Player's blaster configurations may also include combinations as between individual Player's blasters in a peer to peer data link or the like, in the embodiments discussed.

A described embodiment is a game ecosystem with several components. The game ecosystem may be understood by the following description of various elements of the system. The invention advantages may be best understood from the following detailed description taken in conjunction with the drawing figures, e.g., including, but not limited to:

- Conductive suit worn by each player
- Smart dart contains stored energy/capacitive projectiles and charging, an ID, a transmitter, a smart dart tip (switch)/Current closes the loop when a dart hits suit
- Charge the darts—In blaster in milliseconds, in the magazine or barrel or in position before the fire
- Batteries located in the blaster to power blasting, connectivity, User interface, player identification and then contacts/proximity to the magazine to power smart darts stored energy/capacitive projectiles. E.g., Batteries located in the blaster, then contacts into the magazine
- Charge through the conductive tips/NFC charging/NFC tag to identify the dart to the blaster/NFC tags, Bluetooth or UWB beacons around the arena for check points
- UWB (Ultra-Wide-Band) would act as a transmitter/receiver to support player identification
- Projectiles placed into the blaster, are identified, and connect to the player. This indicates who 'owns' the projectile in the battle
- Suit is the actuator, the trigger; a conductive suit you wear which works with the tip of the dart
- Methodology for blaster housed, connecting the player/detect different levels of electrical current/apply a 'value' to a hit on the skin, and a hit on conductive clothing
- Two-way communication, e.g., connect to a game, be informed hit/Hit Resolutions
- Blasters connect into a cloud (and/or) leverage enabling software/application and a master hardware device (handling processing; locally, system arena, and as to blaster (light up panels, audio etc.), for Player (life/score/status), how it indicates, still in or out of play
- Cloud (and/or) software/application and master hardware device, will handle all data input/traffic from multiple blasters/players. Software/application manages data, powering gameplay, leaderboard and statistic features. It will be capable of handling data from multiple logged-in players. The software/application will be able to identify a single player, their ammo, ability to connect players' teams, capture which player 'fired' what projectile and what enemy has been hit/send data back to the blaster/player, e.g., eliminated from the game, powering player blaster down.
- Fast wireless bridge from each blaster to a cloud (and/or) leverage enabling software/application and a master hardware device. Capable of two-way communication.
- Each blaster has a projectile specific "receiver", this specific technology is looking for a projectile "transmission", triggered by a successful hit from an incoming projectile, reading the ID of that projectile.
- Production of conductive tips: flexible tips; strong Dome-shaped design with lower durometer; Conductive added materials/printing
- 3D printed conductive material/Insulator material on top/insulated portion of tips molded—for the high capacity manufacturing
- Conductive Suit: Conductive material/light weave layer over the top of a colorful jersey could allow distinction between players
- Communication between dart/blaster/suit/scoreboard: Smart dart (smart tip); Smart blaster; Smart suit; UWB module (potentially in the suit, or maybe just on a strap that you wear); Select a blaster, join a team via wireless; UWB pairs the suit with the blaster; Smart dart "wakes up" as soon as it's charged, at which time it broadcasts (via UHF and NFC) a dart ID; Smart blaster measures the broadcast and the signal strength RSSI/determines that a certain dart belongs to that blaster
- Blaster 40 shoots the dart/communicated via WAN 46 or UWB to the Cloud 48; Broadcasting on both UHF and NFC for pairings; arena/gameplay supporting "pairing" session before the game starts where players stand on unique spots, far enough away from other players to pair correctly
- Dart hits—the circuit is closed, the dart wakes up and starts broadcasting its ID, blaster of person hit detects the hit and communicates to the Cloud 48.
- Mapping/UWB anchors can be placed strategically in the room, they'll see how far they are from each other to map the environment, they interact with the blasters; creation of a map where everyone is located.

The present described embodiments relate to Interactive detectable projectile system with interactive shooting systems and methods to reliably detect a dart, hitting a person/ player, fired from a blaster, from multiple angles. Then tracking how many times they have been hit for gameplay purpose used with mobile electronic devices including dart launchers with hit point accumulation. Charging blasters and powered or capacitive projectiles are disclosed, such that the contact of the capacitive tip with the electrically conductive suit or surface discharges the dart to communicate through the player blaster. The system facilitates accurately detecting whether a Player is hit, and by which dart/player. A continuity sensor tip design is used for safe and reliable sensing with Player's conductive suits. Each dart includes charging, for example, with a small power source such as a lithium polymer battery, or rechargeable lithium-ion polymer battery (LiPo, LIP, Li-poly, lithium-poly), or rechargeable multi-layered ceramic capacitors.

The toy battle dart shooting gameplay environments support player dart projectile hits or tags with detectable projectile devices. With reference to FIG. 1 an exemplary toy battle environment system 10 is shown provided at a gameplay arena showing Players as wearing Conductive Material/ Ultra-Wide Band (UWB) transmitter in selected blasters from a blaster stand or storage for their individual use. UWB adds deeper level of accuracy within the smart dart system, to reliably identifying the players location, orientation and a timestamp affiliated with the projectile leaving the blaster. In certain embodiments described below UWB provides a beacon for others to Find, which Pings ID to others' receivers via Conductive Material/UWB transmitter. The system 10 provides a first conductive suit 14 for being worn by a first player, and a second conductive suit 16 for being worn by a targeted player for resolving hits to the targeted player from toy projectiles 20 during gameplay. A first player projectile launcher 7 is used for receiving and launching the toy projectiles 20 for use by the first player, and a second or target player projectile launcher 12 is used for receiving and launching the toy projectiles 20 for use by the second or target player. The toy projectiles 20 are smart projectiles of darts each incorporating and internal memory 22, a projectile beacon transmitter 24, and an electrical energy storage element or a capacitor energized via a charging coil 28 and internal circuitry 28, and a conductive projectile tip 30. The conductive projectile tip is fabricated with a Roll-to-Roll (R2R) manufactured flexible electronics printed circuit board including operative circuitry within the projectile tip 30 at an end of said projectile body 20. The memory 22 may be encoded with first player projectile launcher identifying information when said first player projectile launcher receives the toy projectiles 20, and the conductive projectile tip operates with the second conductive suit 16 upon contact therewith to switch the electrical energy storage to the projectile beacon transmitter circuitry 24. The targeted player projectile launcher 12 may also include a projectile beacon receiver responsive to the first player projectile launcher 7 identifying information from the projectile beacon transmitter for communicating the projectile tip hit contact in the vicinity of the targeted player.

The first player projectile launcher 7, second targeted player projectile launcher 12 each have information processors, including a targeted player launcher transmitter for communicating the projectile tip 30 contact with the second conductive suit 16 as a targeted player hit from the first player projectile launcher 7. The first player projectile launcher communicates to the targeted player projectile launcher information processor the targeted player hit from the first player projectile launcher further to the projectile tip contact with the second conductive suit. The targeted player projectile launcher may send a targeted player beacon signal transmitter thus transmits targeted player projectile launcher identifying information, with the first player projectile launcher having a targeted player beacon signal receiver for receiving the targeted player beacon signal. The targeted player projectile launcher identifying information with the first player projectile launcher launching the toy projectile at the targeted player for the targeted player hit from the first player projectile launcher communicates to the targeted player projectile launcher information processor further to the projectile tip contact with the second conductive suit as the targeted player hit from the first player projectile launcher. Thus the targeted player hit from the first player projectile launcher may combine the received targeted player beacon signal along with the projectile tip contact with the second conductive suit to resolve the targeted player hit from the first player projectile launcher. In a described embodiment, system 10 game server communicates with players' projectile launcher information processors to communicate targeted player hits from the first player projectile launcher further to the projectile tip 30 contact second conductive suit 16. In further embodiments, Cloud 30 UWB transceivers are provided each of the player projectile launcher smart blasters 40. The player blasters 40 may thus communicate projectile launcher information including launch time, range and orientation angle reports for the toy projectile launched from each player projectile launcher. In further embodiments, an arena system 10 may be defined to include an arena information processor and an arena UWB Transceiver for gameplay within the arena, in communication with the game server and each of player projectile launchers information with the arena information processor, including launch time, range and orientation angle reports for the toy projectile launched from said first player projectile launcher. The system 10 resolves hits of the targeted player projectile launcher information processor to communicate the targeted player hit from the first player projectile launcher further to the projectile tip contact with the second conductive suit.

As described, a system may employ interactive shooting battling provide arrangements as between players individually or within an arena architecture facilitated Targeted Player Hit Resolution via data communications with detectable projectiles and interactive shooting systems and methods. Referring now to the drawings and especially FIGS. 1, 2A, 6A and 10A through 10H, an exemplary combination gun and target device for facilitating a toy battle dart shooting arena game play where dart projectile hits or tags are accomplished using detectable projectile devices in a system employing interactive shooting as shown and described herein. The toy battle environment as shown in FIG. 1 of the various embodiments described may be provided as within an arena 10 with system architecture facilitated Targeted Player Hit Resolution via data communications to game server, e.g., wireless BLE, Zigbee, ANT open access multicast wireless sensor networks.

Figure 2A:
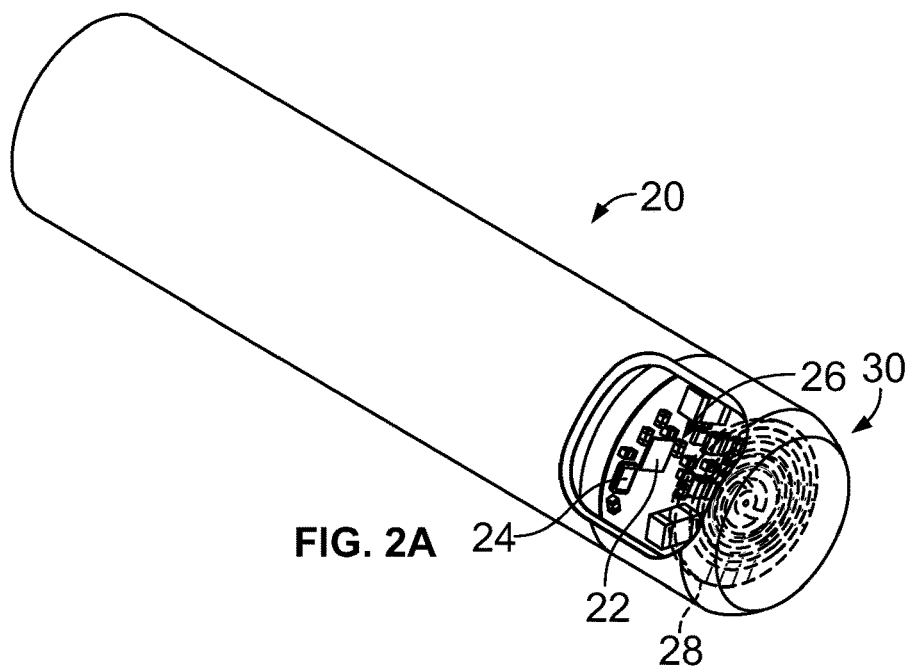
FIGS. 2A through 2C illustrate Smart Dart/Smart Tip, and Smart Blaster Technical Design and Printed Electronics Printed Circuit Board (PCB) sensors in accordance with the present inventions.
Figure 2B:
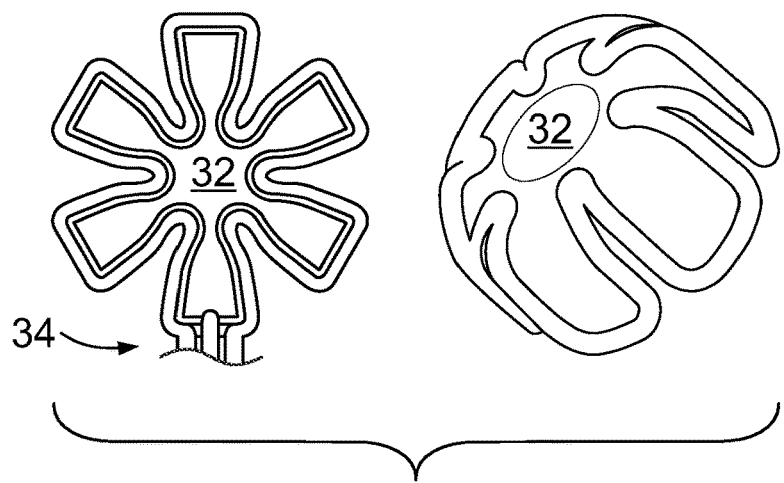
Figure 2C:
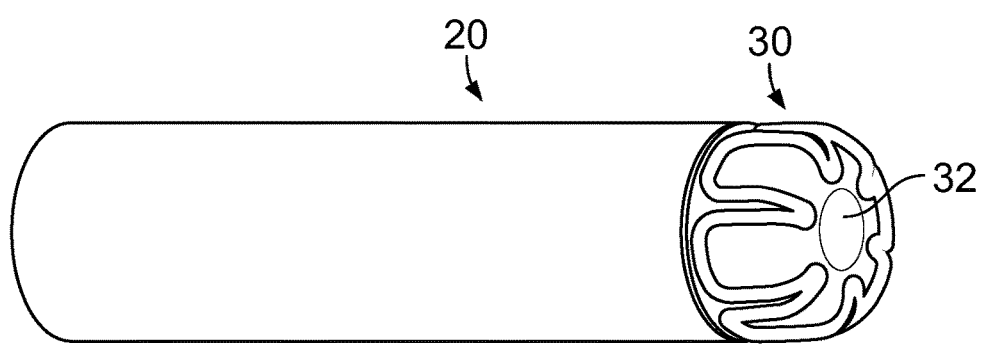

FIGS. 2A through 2C show Smart Dart/Smart Tip, and Smart Blaster Technical Design and Printed Electronics Printed Circuit Board (PCB) Tips sensors petal design 32 PCB. The smart projectiles 20 toy darts internal circuitry 28, internal memory 22, beacon transmitter 24, and electrical energy capacitor and charging coil 28 and, outer conductive projectile tip 30 manufacture as in FIGS. 2A and 3A through 3J printed electronics continuity sensor via flexible PCB conductors 2.5 kOhm resistive continuity with a 2.4 Ghz transceiver, e.g., NXP Firmware Nordic Semiconductor nRF52805, nRF52810 or other System on Chip SoC Bluetooth 5.2 platform or the like support BLE or other communications such as Zigbee allowing for the electronics onboard the dart below 5 grams without suffering in flexibility in use. FIG. 2B uses die-cut or laser-cut Thermoplastic polyurethane (TPU) substrate or thermoplastic elastomers (TPE) with conduct elements shown in broken lines such as silver conductive ink or other suitable electrically conductive elements, e.g. carbon nano tubes (CNT) or graphene, spaced along the outer surface of the non-conductive segments of the dart tip as illustrated in FIGS. 2A and 2B. The FIG. 2C Aerodynamic design facilitates Tracking Hits and/or Missed vis the dart tip conductive elements on TPU substrate, such that a 2.4 gHz radio frequency RF Beacon from the dart as measured at the blaster, as discussed in connection with FIGS. 16 through 18 below.

Figure 3A:
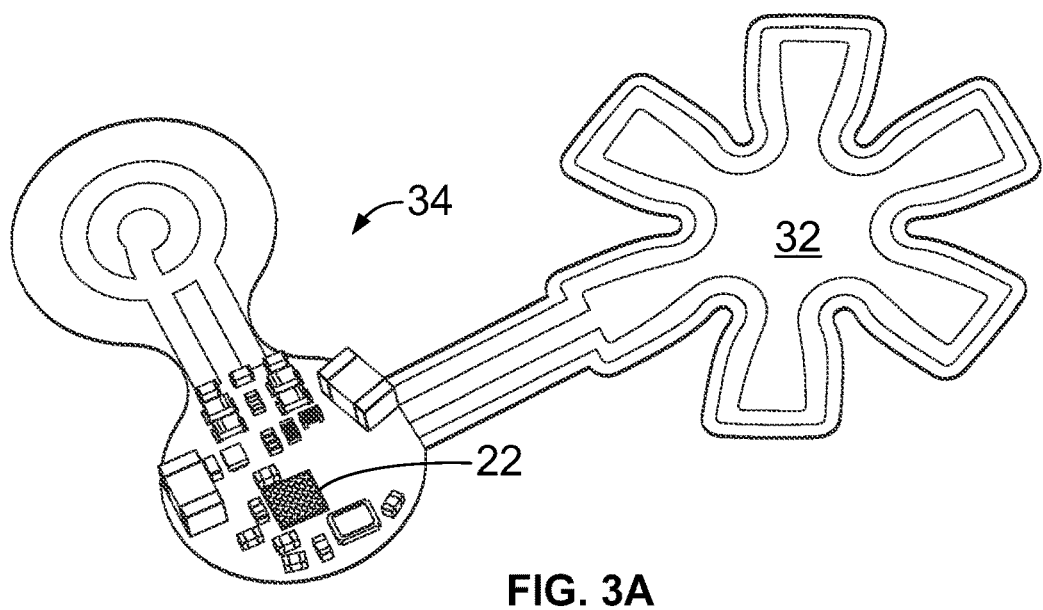
Figure 3B:
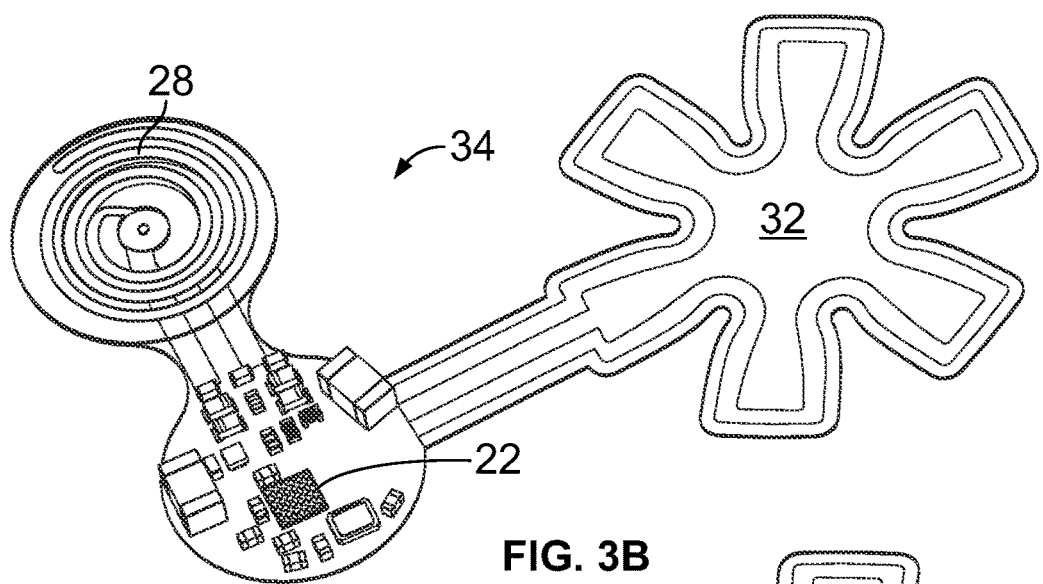
Figure 3C:
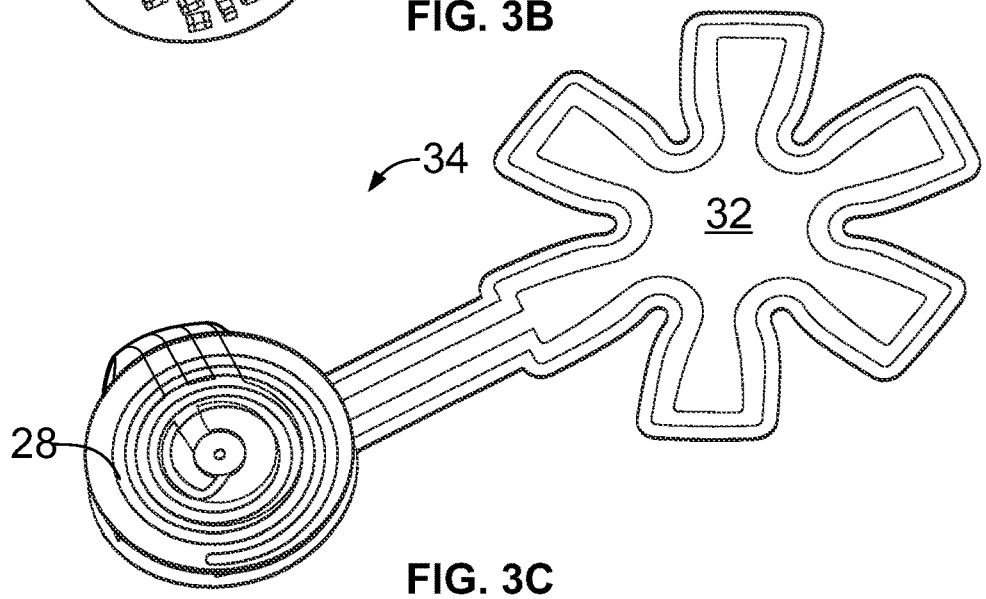
Figure 3D:
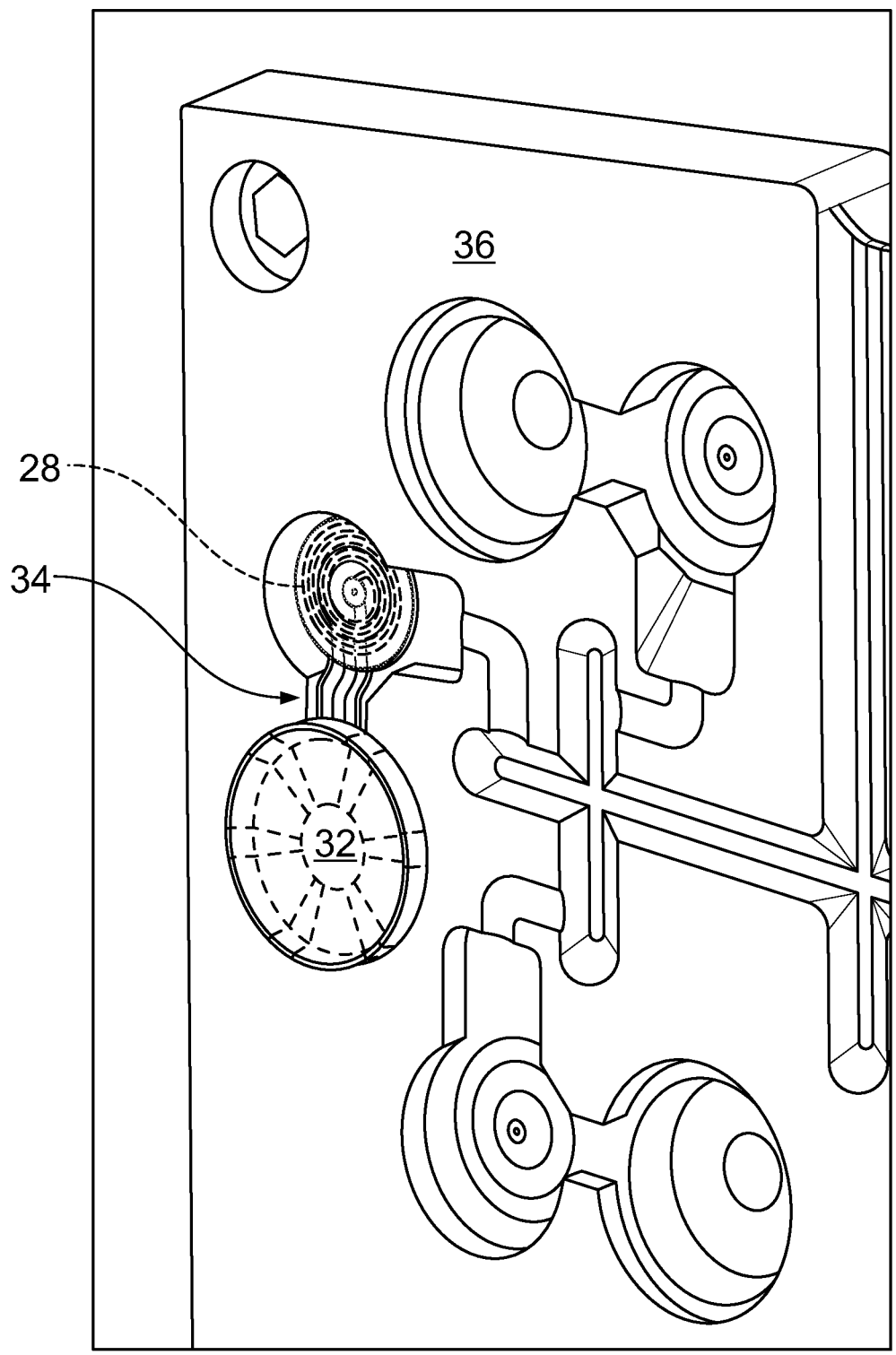
Figure 3G:
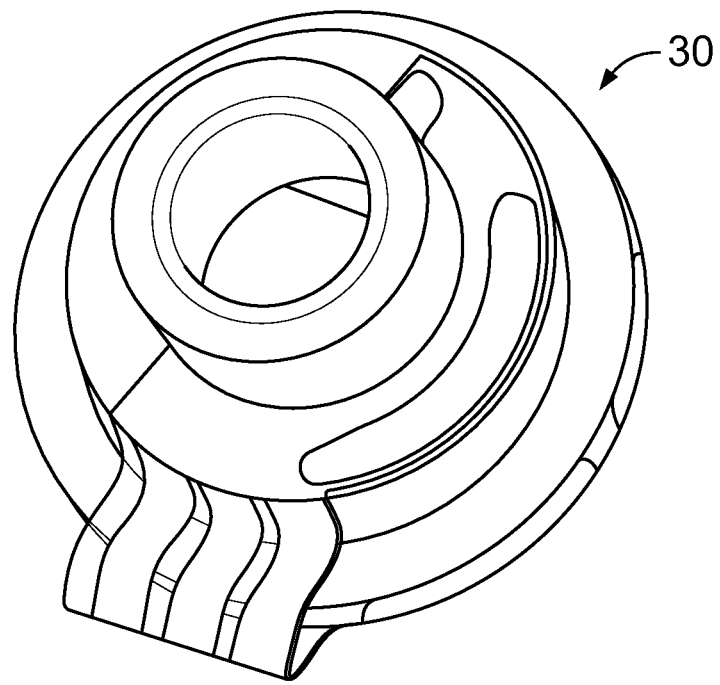
Figure 3H:
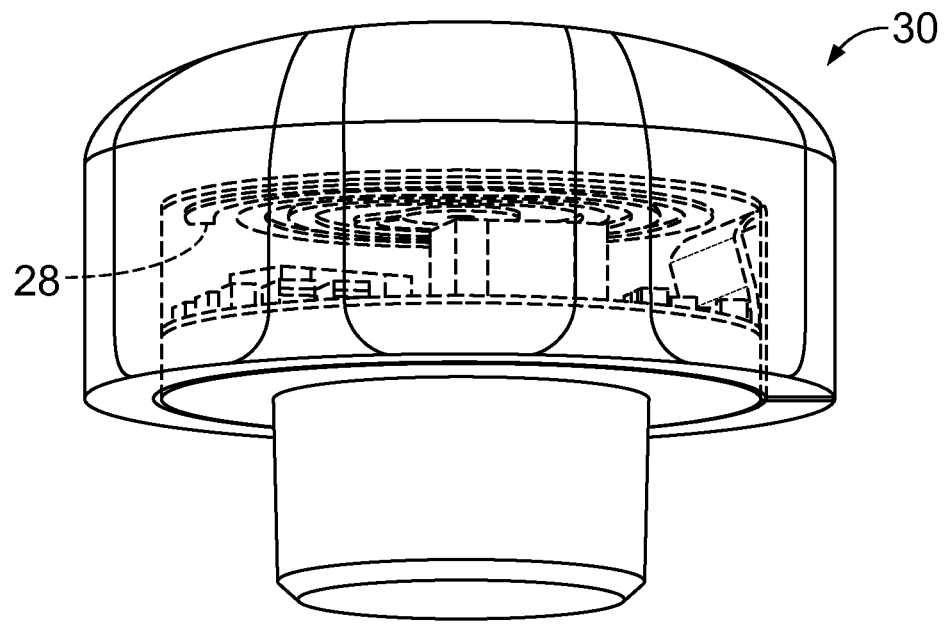
Figure 3I:
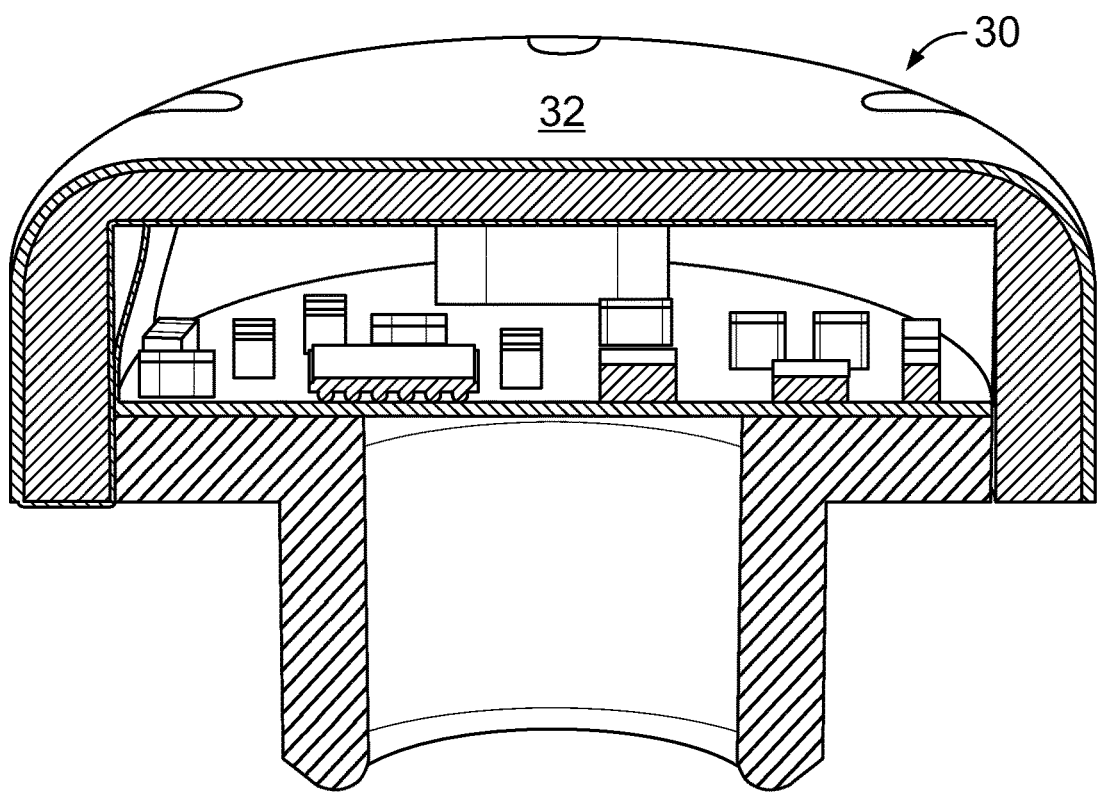
Figure 3J:
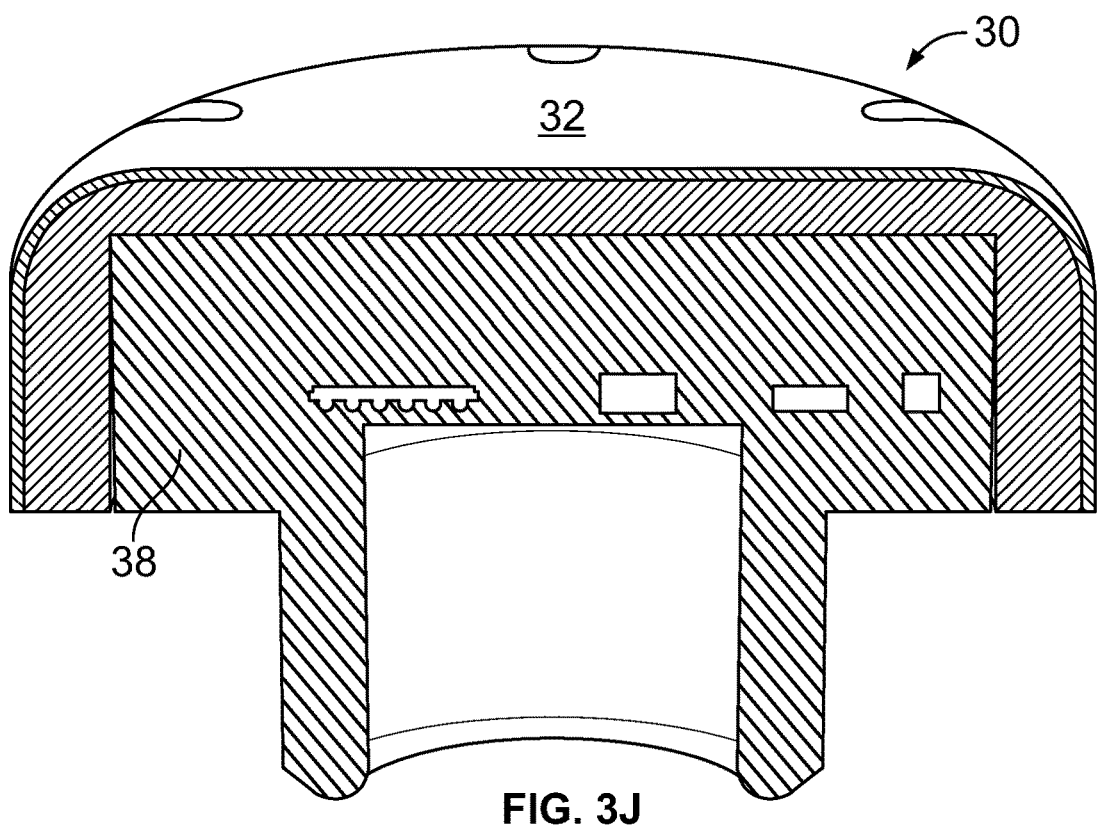

FIGS. 2B, 2C, and 3A through 3J further provide Smart Dart/Smart Tips petal design 32 PCB configurations with adjoined to the electronics, construction methodology and assembly implementing designs of FIGS. 2A-2C with PCB fabricated electronics, for powered or capacitive projectiles and sensors disclosed, sensors. The PCB and injection molding processes may include steps of: fabricating printed conductive paths, traces on the top of the dart, with all the resistors, capacitors and ICs; over-mold projectile conductive contacts tip 30 petal pattern onto printed circuit R2R fabricated flexible electronics printed circuit board including operative circuitry (FIGS. 3A-3C); Add TPU injection mold potting extending PCB, i.e., interconnection ribbon circuit 34 between petal tip 32 and coil 28 (FIG. 3D); Fold circuit into tip to lock circuit in place (FIGS. 3E-3F); Fold antenna over and press against TPU potting, locking in place (FIGS. 3G-3H); with folded antenna over and press against TPU potting (FIGS. 3I-3J). Alternatively solvent stem weld may assemble tip and/or glue foam body to stem.

Figure 4A:
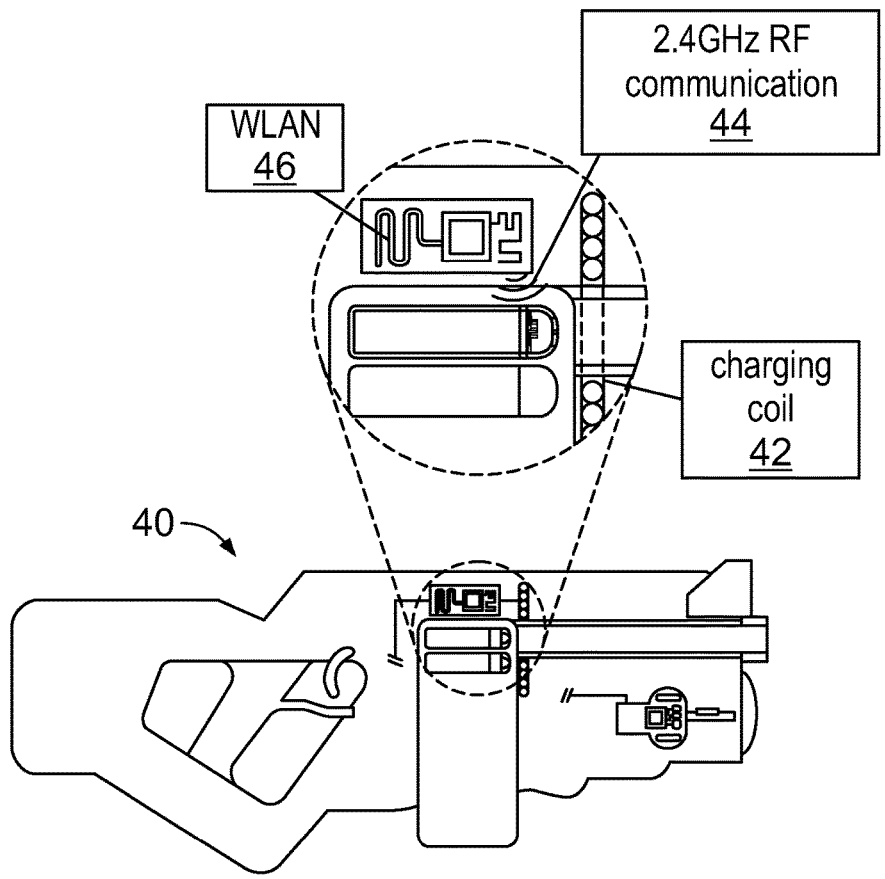
FIGS. 4A and 4B illustrate Smart Blaster communications and charging design electronics high-level structures for use with the Smart Dart/Smart Tip capacitive and/or inductive charging sub-systems with further accessories for information communications, display and ports and the like, of foregoing FIGS. 2A through 3J operative with Smart Blaster Designs in accordance with the present inventions.
Figure 4B:
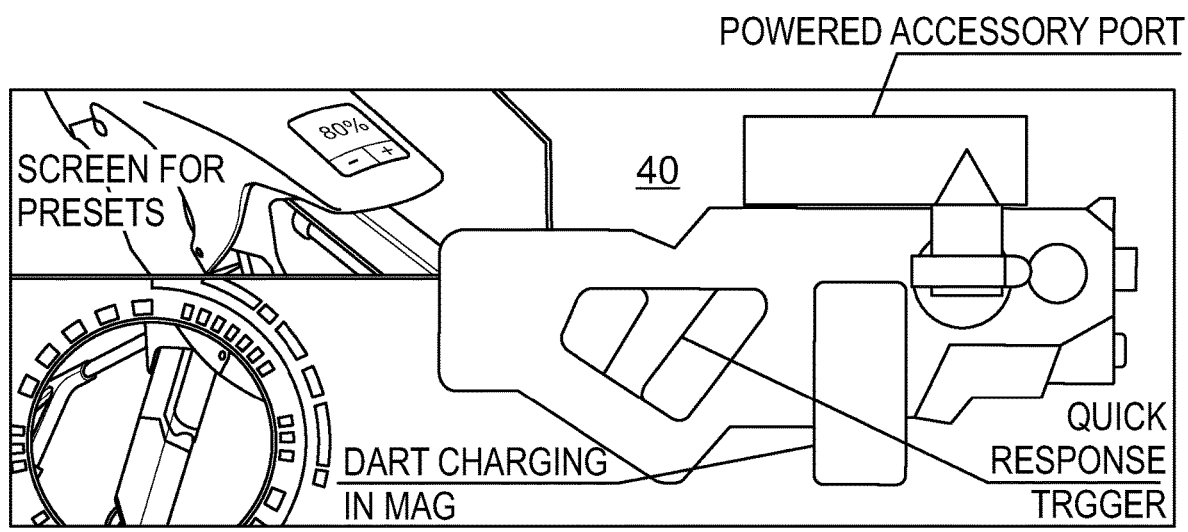

Charging blasters 40 and powered or capacitive projectiles 30 are disclosed, such that the contact of the capacitive tip with the electrically conductive suit or surface discharges the dart to communicate through the player blaster. The system facilitates accurately detecting whether a Player is hit, and by which dart/player. A continuity sensor tip design is used for safe and reliable sensing with Player's conductive suits. Each dart includes charging, for example, with a small power source such as a lithium polymer battery, or rechargeable lithium-ion polymer battery (LiPo, LIP, Li-poly, lithium-poly and the like), or a capacitor being rechargeable. FIGS. 4A and 4B illustrate Smart Blaster communications and charging design electronics high-level structures for use with the Smart Dart/Smart Tip capacitive and/or inductive charging sub-systems with further accessories for information communications, display and ports and the like, of foregoing FIGS. 2A through 3J operative with Smart Blaster configurations.

Figure 5:
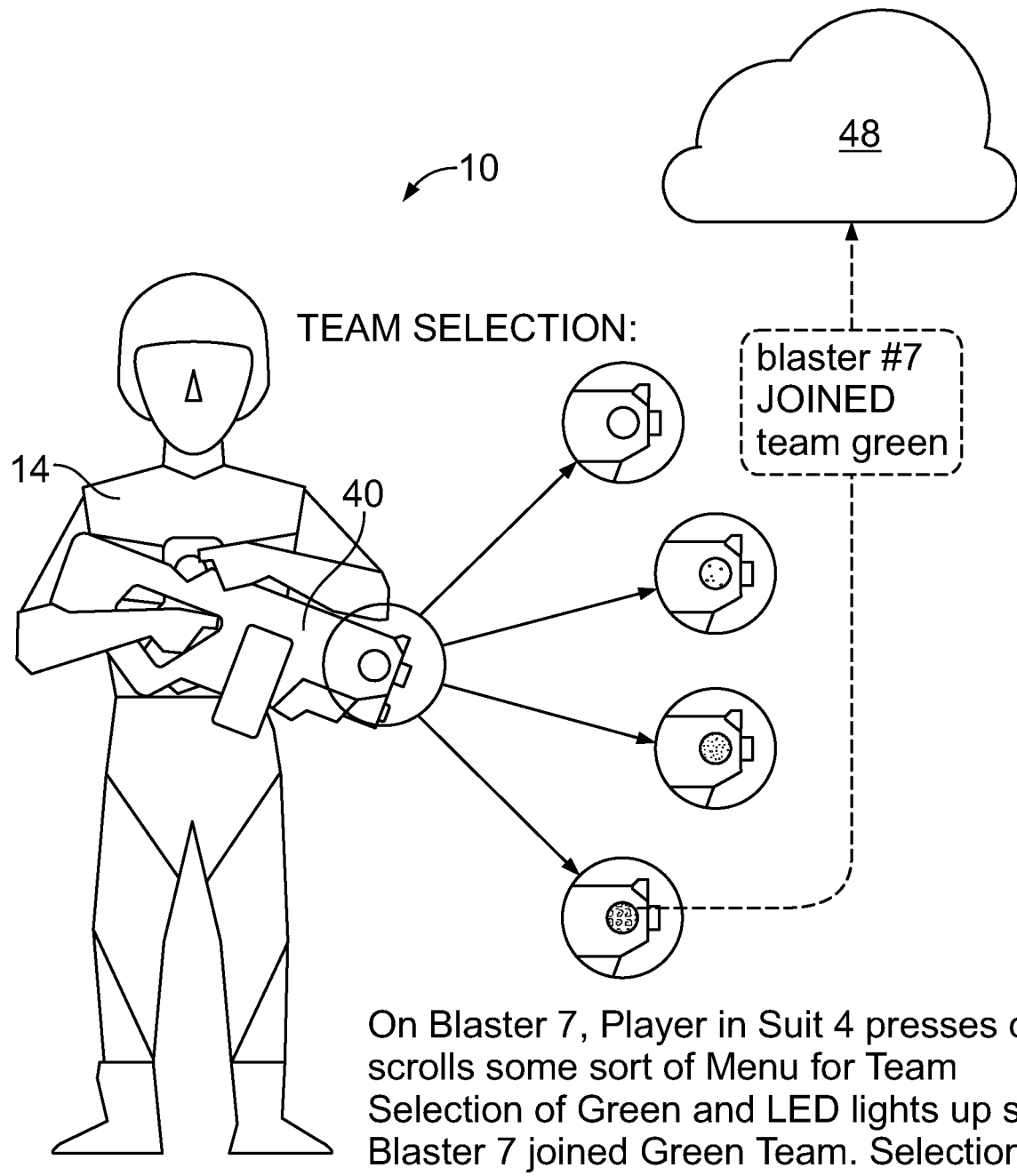
FIG. 5 illustrates a Player as wearing one of the aforementioned suits, selecting Team and blaster IDs e.g., through communication capabilities, UWB, Wi-Fi to Cloud and the like for Cloud information messaging Team/Blaster Selection Team Join Selection sent for their individual use in accordance with various embodiments of the present inventions.

FIG. 4A/FIG. 4B, Smart Blaster 40 communications WAN 46 (Wi-Fi, and 2.4 Ghz RF communication 44), and charging (inductive charging coil 42) Screen for Pre-sets; Powered accessory Ports, Dart Charging in Magazine/dart clip. FIG. 5 illustrates a Player selects Team and blaster IDs e.g., through communication capabilities, UWB, Wi-Fi to Cloud 48 and the like for Cloud 48 information messaging Team/Blaster Selection Team Join Selection sent for their individual use. TEAM SELECTION (messages sent to Cloud 48/Blaster 7 Joined Green Team): On Blaster 7, Player in Suit 4 presses or scrolls some sort of Menu for Team Selection of Green and LED lights up so Blaster 7 Joined Green Team. Selection sent through Wi-Fi to Cloud 48.

Figure 6A:
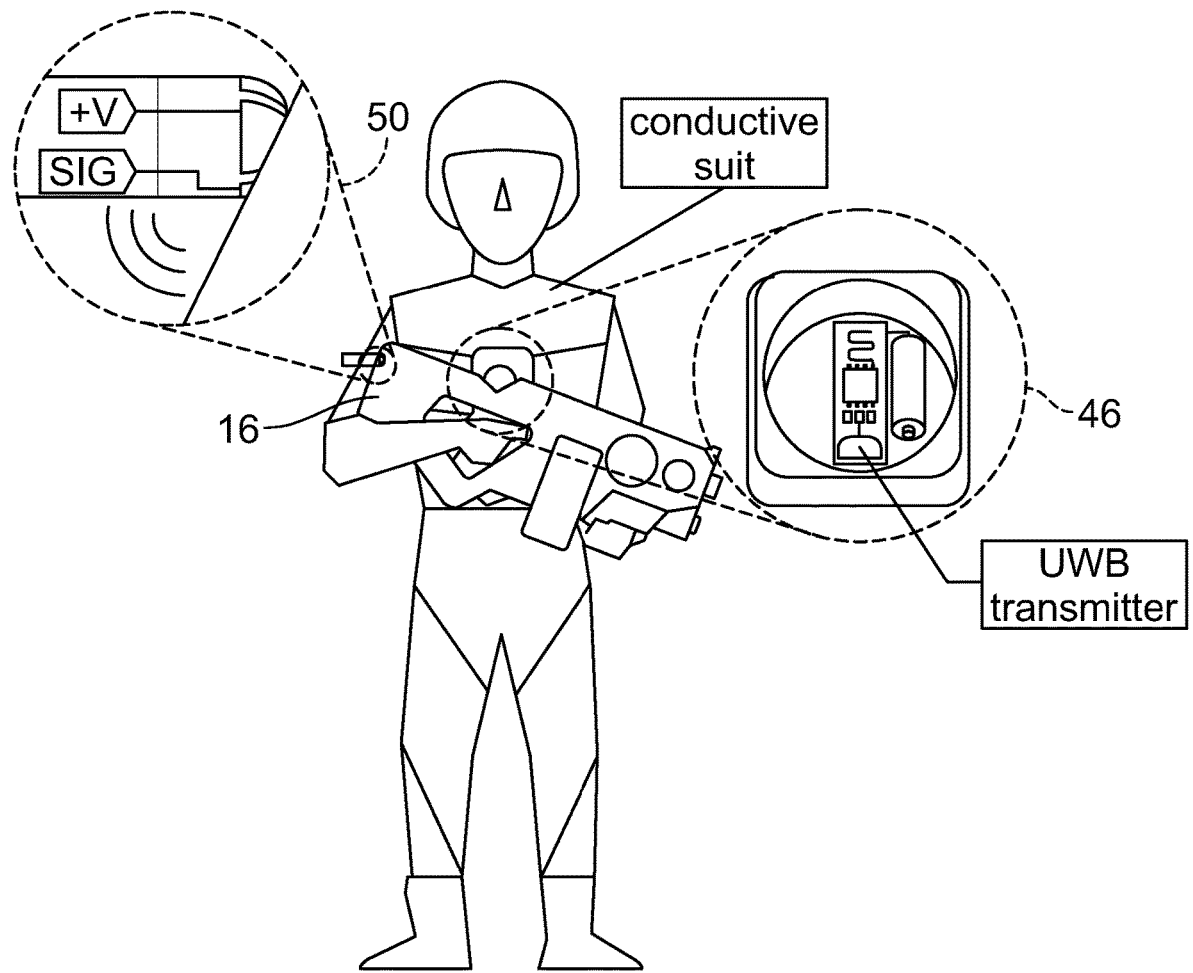
FIG. 6A through 6E illustrate Player enabled dart tip communications via metallic weave, custom printable Player suits/UWB capabilities with cooperative blaster implementations for Hit detection, with FIG. 6C particularly illustrating Suit Pairing cloud messaging for Suit pairing with Blaster via UWB Beacon communications and the like for Pairing information Sent to Cloud.
Figure 6B:
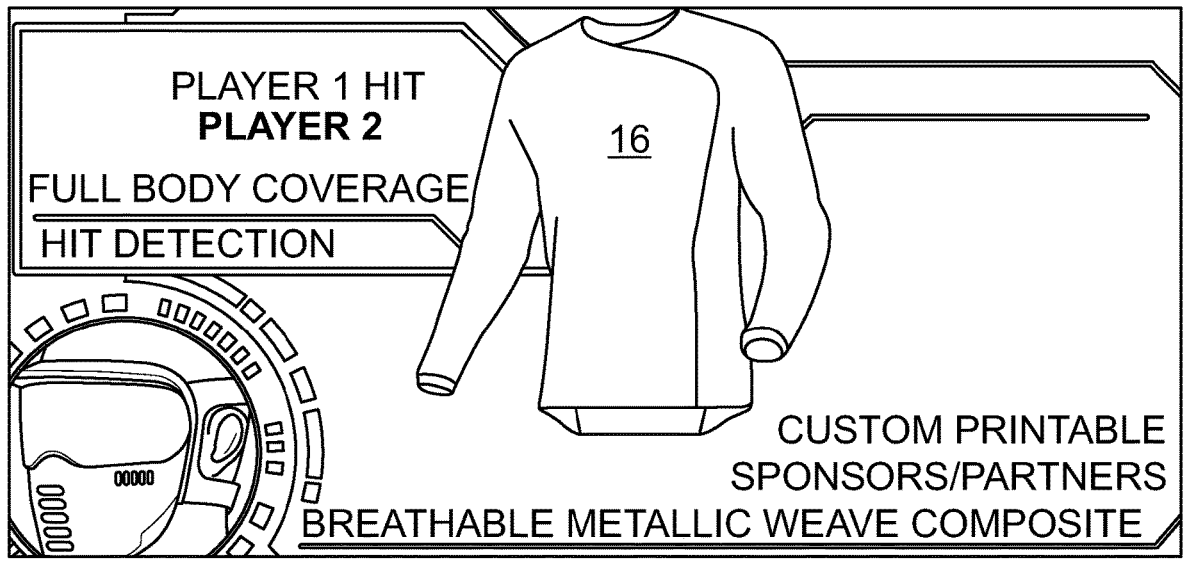
Figure 6C:
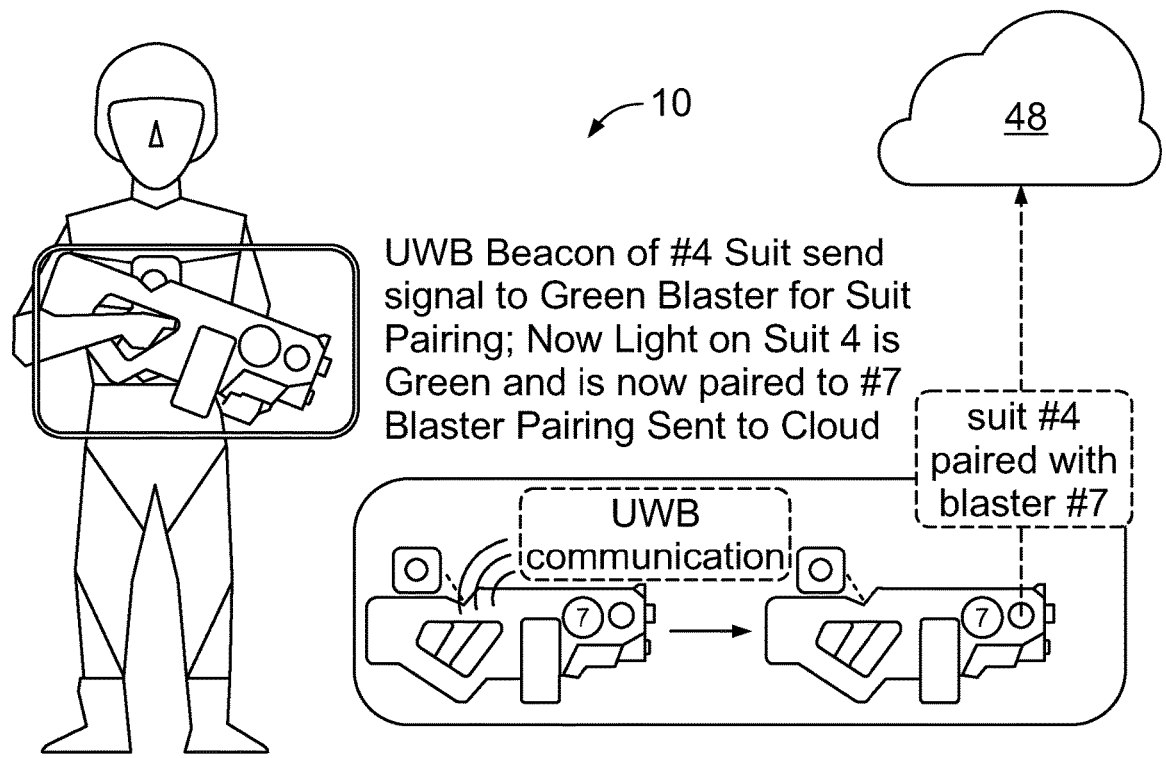

FIG. 6A through 6E the system 10 allows Player enabled dart tip conductive communications via metallic, custom weave printable Player suits 16 in FIG. 6B. FIG. 6C illustrates Pairing Cloud 48 messaging for Suit or Blaster pairing via UWB Beacon communications and the like for Pairing information Sent to Cloud 48. FIG. 6A through 6C illustrate Player are enabled dart tip communications via metallic weave, custom printable Player suits/UWB capabilities with cooperative blaster implementations for Hit detection, with FIG. 6C particularly illustrating Suit Pairing (messages sent to Cloud 48 . . . Green Suit 4 paired with Blaster #7): UWB Beacon of #4 Suit send signal to Green Blaster for Pairing; Now Light on Suit 4 is Green and is now paired to #7 Blaster Pairing Sent to Cloud 48, for of UWB beacons for others to Find/Ping IDs to others' receivers. The metallic weave, custom printable suit of FIG. 6C facilitates Suit Pairing (messages sent to Cloud 48/Green Suit 4 paired with Blaster #7): UWB Beacon of #4 Suit send signal to Green Blaster for Pairing; Now Light on Suit 4 is Green and is now paired to #7 Blaster Pairing Sent to Cloud 48.

Figure 6D:
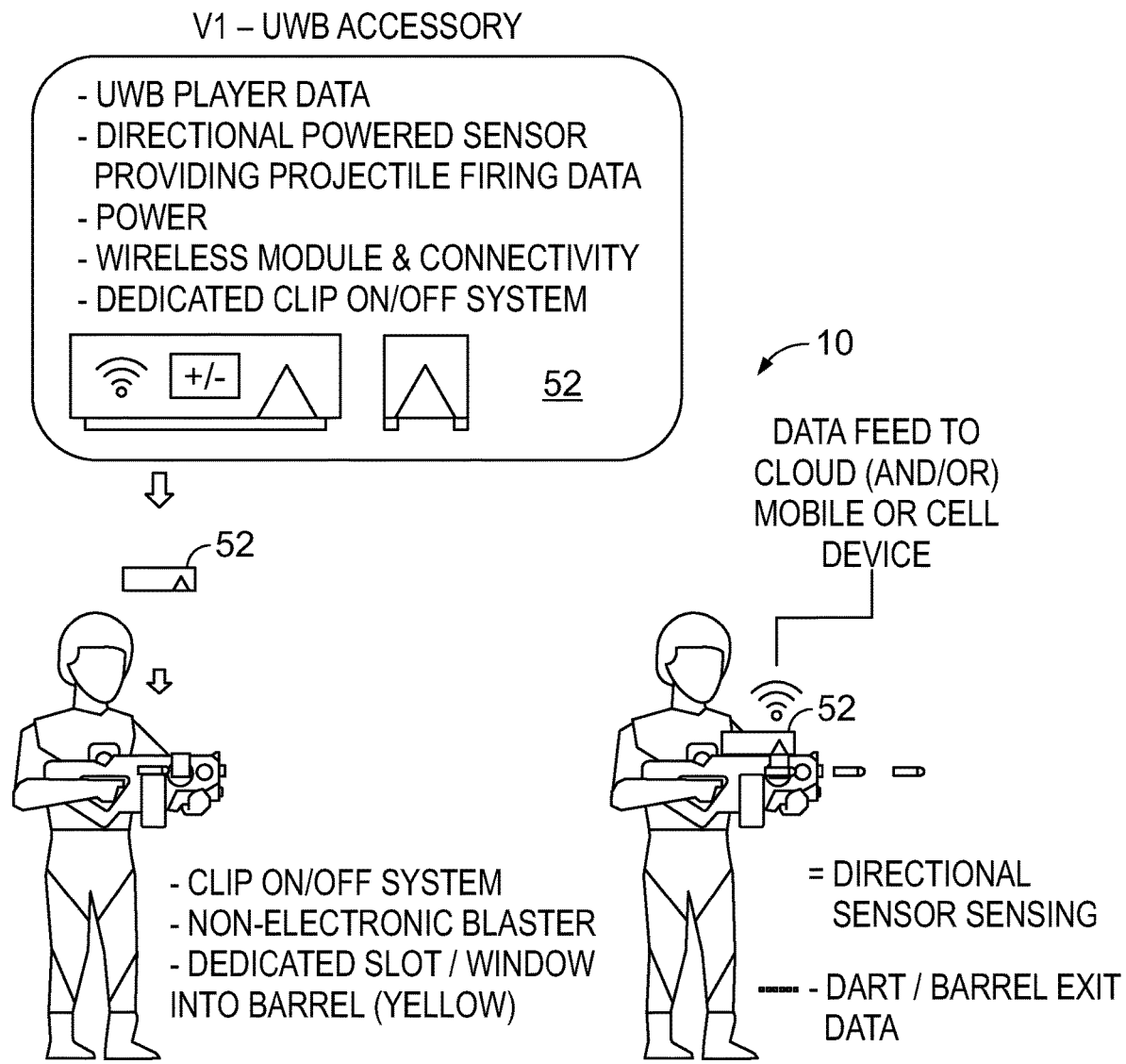

Each player projectile blaster, launcher 40 may include UWB capabilities with cooperative blaster integrated or embedded UWB. Referring to FIG. 6D, UWB integrated within the blaster provides for location data+a timestamp data which is captured at the release of dart from firing mechanism exiting the barrel. Allows both data points to indicate the identity and position of the "firing player." The incoming dart which strikes an "opposite player", transmits a hit signal, upon contact of a conductive their suit. The signal is picked up by the nearest blaster. The UWB location and position data of the "opposite player" is linked with the blaster which picked up the signal. This supports the overall accuracy and can help filter out if two players are close together.

Figure 6E:
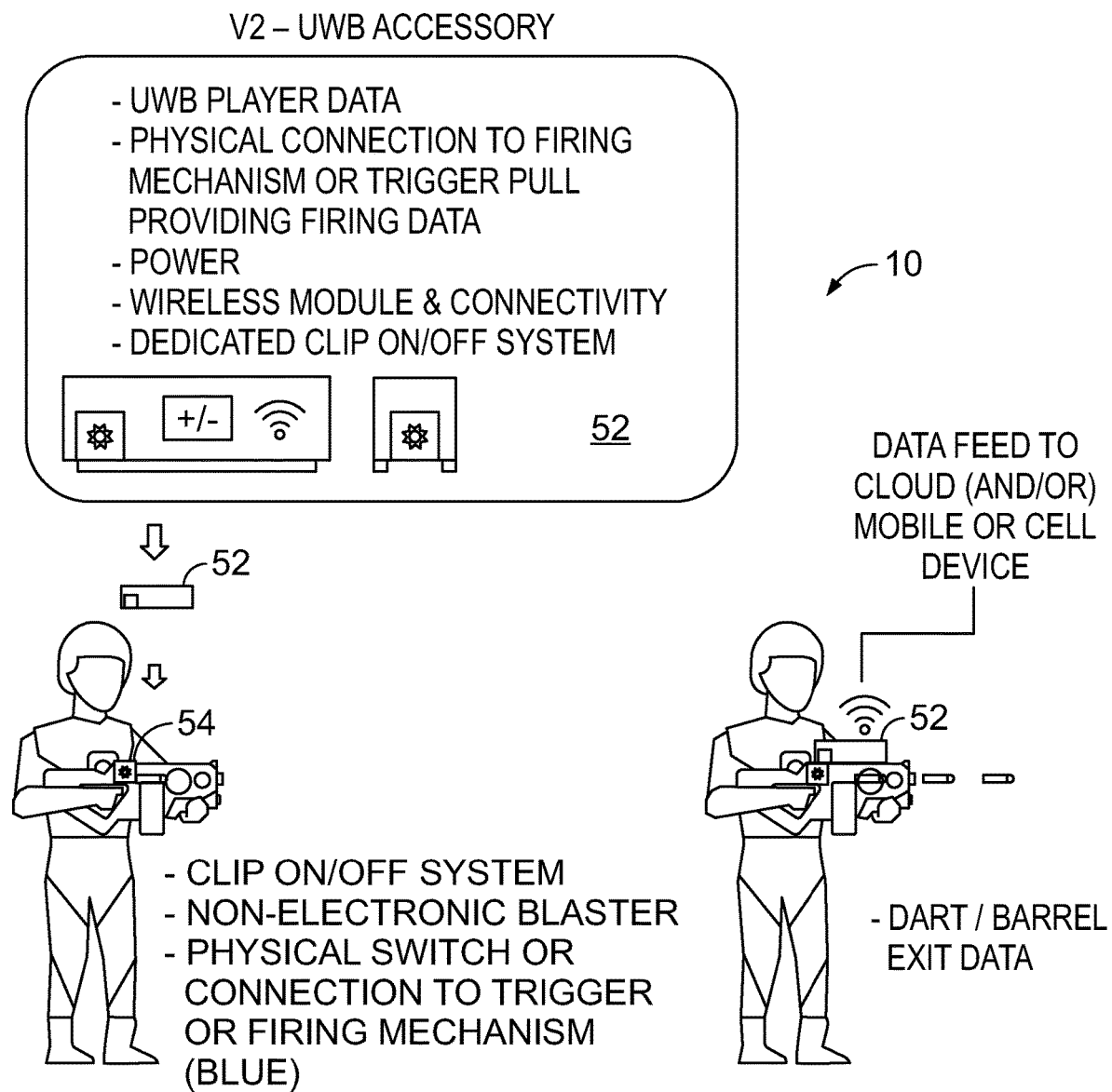

Referring to FIG. 6E, an accessory UWB (non-embedded) module may be attached as compatible with a purpose designed lower complexity blaster. Thus, UWB may be added to a blaster, as a removable accessory. This would be clipped on/in a dedicated designed blaster, locked into a dedicated location. This could be a known method of connecting an accessory, such as a tactical rail. The accessory adds the same functionality as an embedded UWB to identify the location of the firing player. The non-embedded UWB Accessory provides all the needed electronics and power, all embedded within a self-contained device. In its locked in a dedicated location on the blaster, in V1, a known sensor (such as, and not limited to infrared) in a dedicated orientation, can detect a passing projectile, as it's fired through the barrel, or as in V2 using a physical switch or connection point to the trigger or firing mechanism, indicating the projectile has been released and fired. Two sets of data, (A) the UWB data of the "firing player", paired with (B) the successful detection and timestamp of the projectile leaving the barrel, gives the same level of data as the Integrated or embedded UWB solution.

Figure 7:
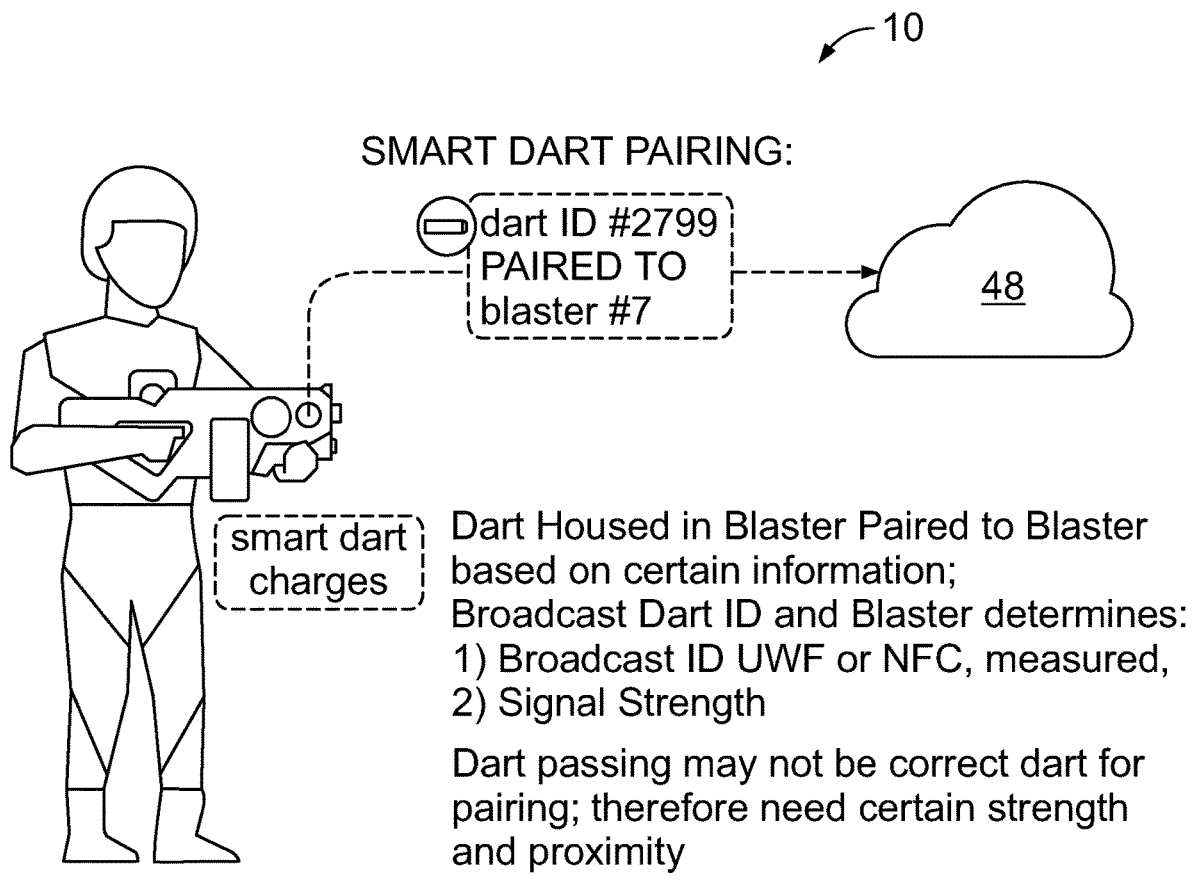
FIG. 7 illustrates Smart Dart Pairing for Cloud communications messaging for sending Dart IDs Paired to Blaster time-stamped IDs sent for Pairing information Sent to Cloud for Players shown in accordance with the embodiments of the present inventions.

FIG. 7 illustrates Smart Dart Pairing for Cloud 48 communications messaging for sending Dart IDs Paired to Blaster time-stamped IDs sent for Pairing information Sent to Cloud 48 for Players. SMART DART PAIRING: (messages sent to Cloud 48/Dart ID #2799 Paired to Blaster #7) Dart Housed in Blaster Paired to Blaster based on certain information; Broadcast Dart ID and Blaster Decides if: 1) Measures Broadcast ID UWB or NFC; 2) Signal Strength. Dart passing may not be correct dart for pairing; therefore need certain strength and proximity (validated via RSSI received signal strength). The dart emits its referenced RF Beacon signal to the blaster and depending on the embodiment the blaster directly uses the RSSI of that signal to determine the hit, such that the 2.4 gHz radio frequency RF Beacon from the dart as measured at the blaster, as discussed in connection with FIGS. 16 through 18 below. In the game server embodiments, the blaster relays information concerning the dart signal, time-stamps to the server which resolves the hit and communicates back to the blasters via UWB as to the hit resolution determined.

Figure 8:
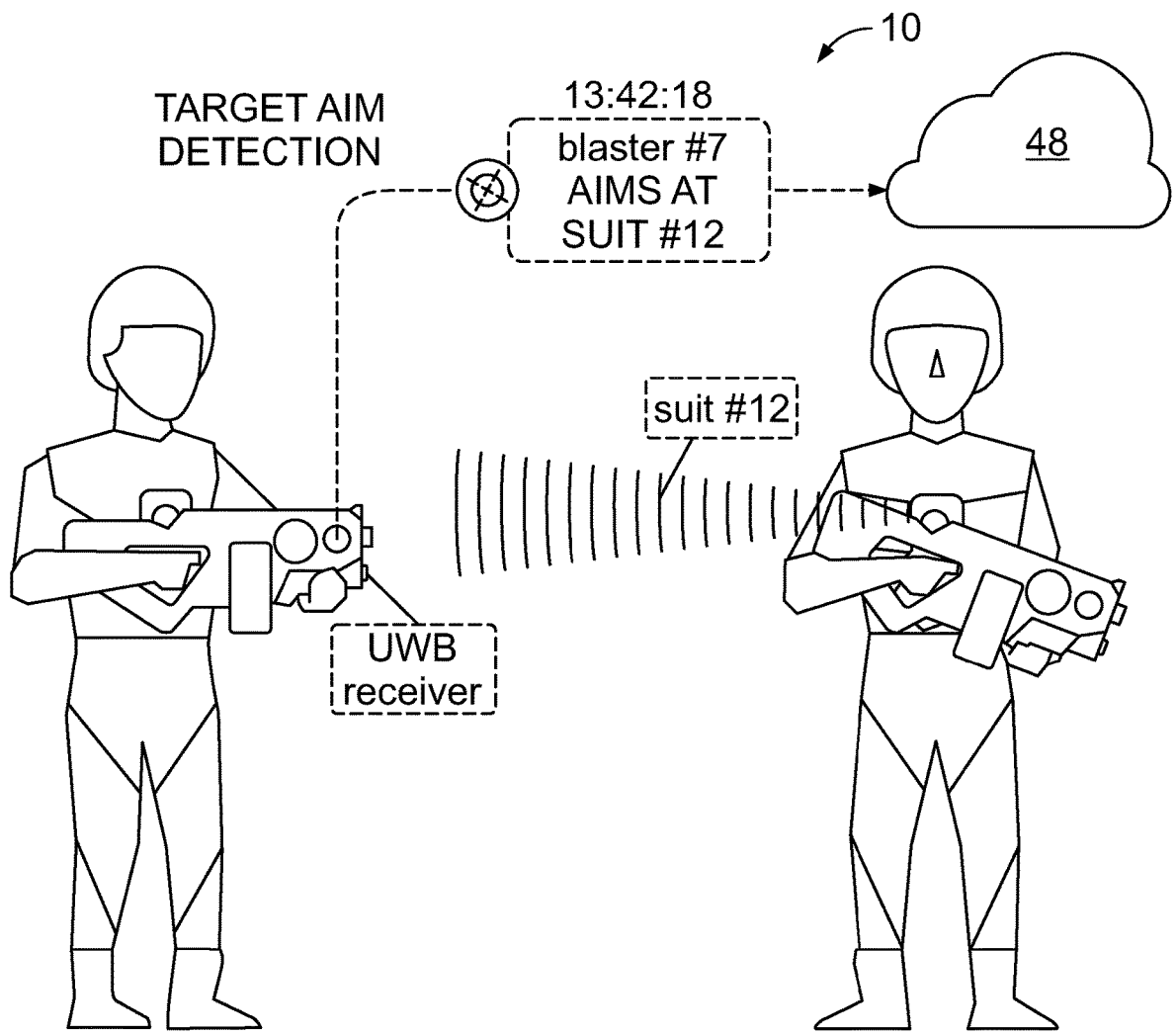
FIG. 8 illustrates Target Aim Detection for Cloud communications messaging time-stamped IDs sent for Target Aim Detection information sending beacon including information of ID Sent to Cloud for Players shown in accordance with the embodiments of the present inventions.

FIG. 8 illustrates Target Aim Detection for Cloud 48 communications messaging time-stamped IDs sent to . . . for Target Aim Detection information sending beacon including information of ID Sent to Cloud 48 for Players shown. TARGET AIM DETECTION: (Blaster #7 Aims at Suit #12; time-stamp 13:42:18, messages sent to Cloud 48), Dart 4 always goes asleep to conserve power. The UWB of Suit 12 is always sending beacon including information of ID; Blaster 7 receiver pointed in direction of Beacon sends information to Cloud 48: 1) Blaster 7 is pointed/aimed at Suit 12; 2) Time of Pointing by Blaster 7 is known; 3) We know distance between blaster 7 and Suite 12; 4) Suit 12 UWB knows distance/proximity of blaster 7 (Suite 12 has Receiver).

Figure 9:
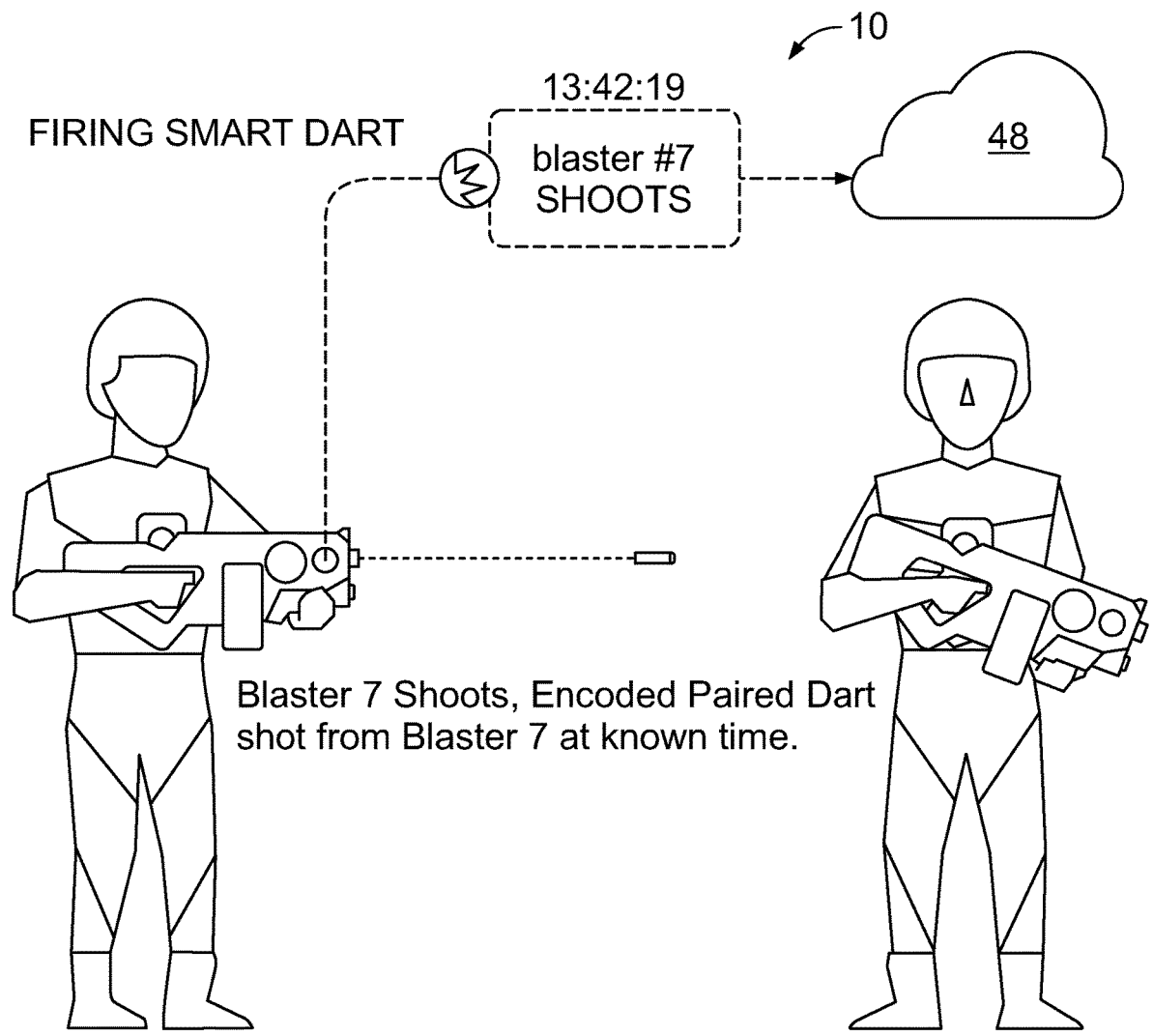
FIG. 9 illustrates Firing Smart Dart for Cloud communications messaging for time-stamped IDs sent for Firing Smart Dart information of Encoded Paired Dart shot from Player Blaster at known time Sent to Cloud for Players shown in accordance with the embodiments of the present inventions.

FIG. 9 illustrates Firing Smart Dart for Cloud 48 communications messaging for time-stamped IDs sent for Firing Smart Dart information of Encoded Paired Dart shot from Player Blaster at known time Sent to Cloud 48 for Players. FIRING SMART DART: (Blaster #7 Shoots; time-stamp 13:42:19, messages sent to Cloud 48). Blaster 7 Shoots; Encoded Paired Dart shot from Blaster 7 at known time.

Figure 10A:
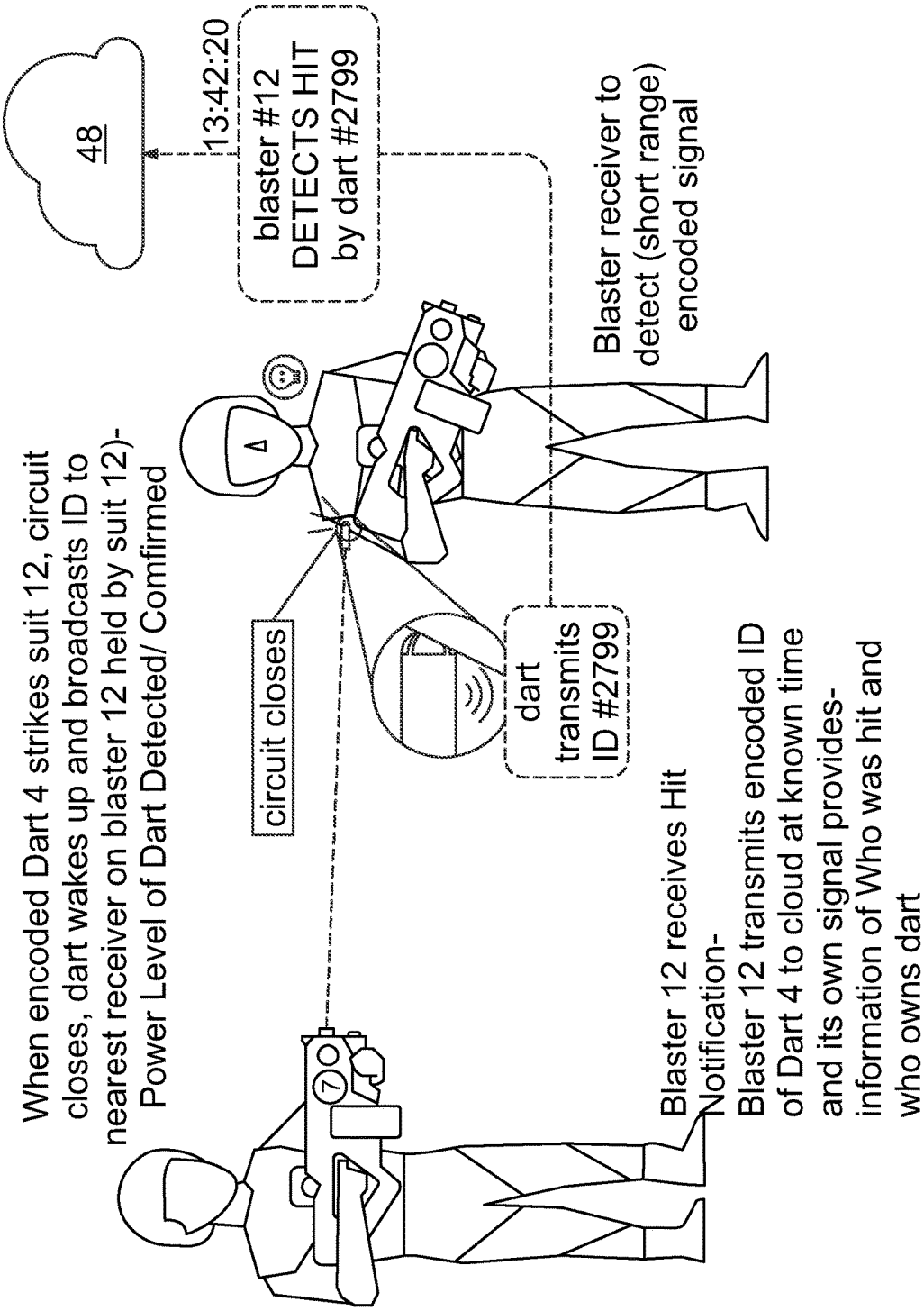
FIG. 10A illustrates Hit Detection for Cloud communications messaging for time-stamped IDs sent for Hit Detection information when an encoded Dart strikes a Player Suit, dart wakes up and broadcasts ID to nearest receiver on Player blaster Sent to Cloud for Players as shown, where
Figure 10B:
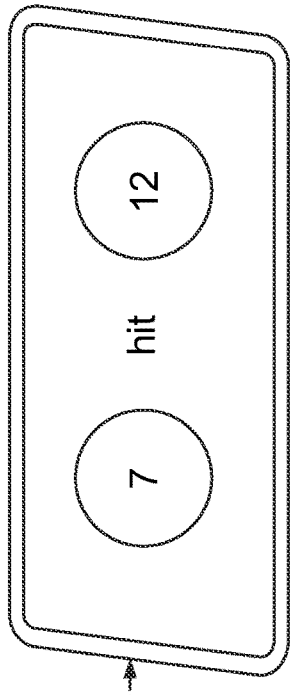
FIG. 10B illustrates Cross-Referencing steps according to the aforementioned SMART DART PAIRING, TARGET AIM DETECTION, FIRING SMART DART, and HIT DETECTION respectively of FIGS. 7, 8, 9, and 10A in accordance with the foregoing embodiments, with FIGS. 10C through 10H showing exemplary supporting Game Mapping, arena room, Game Mapping, elevational barriers with obstacles, barriers plan and the like for the toy battle environment arena gameplay of the present inventions.
Figure 10B:
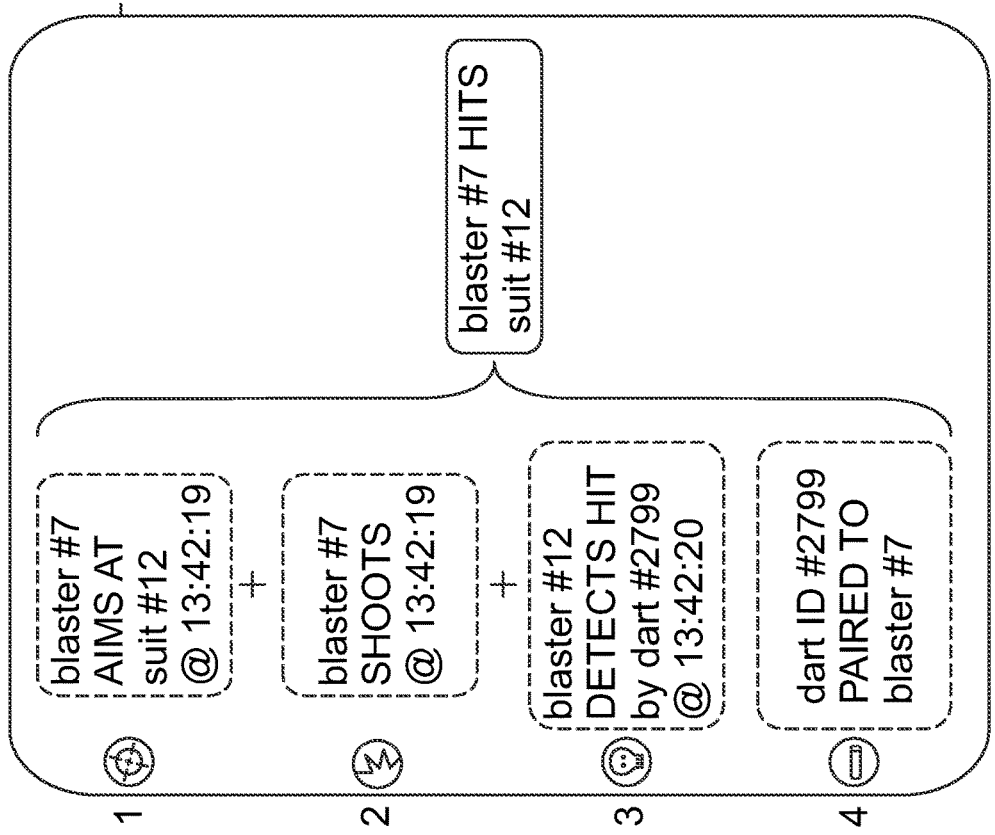
Figure 10C:
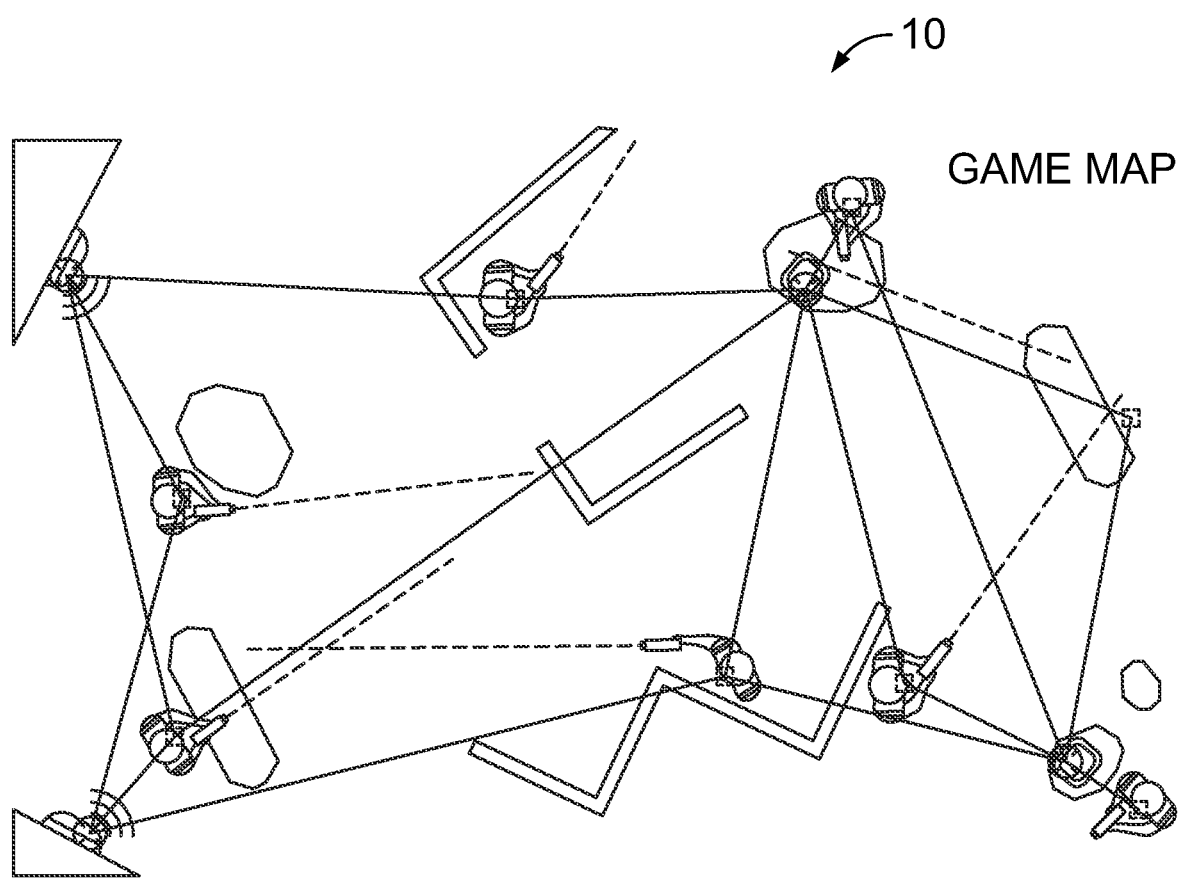
Figure 10D:
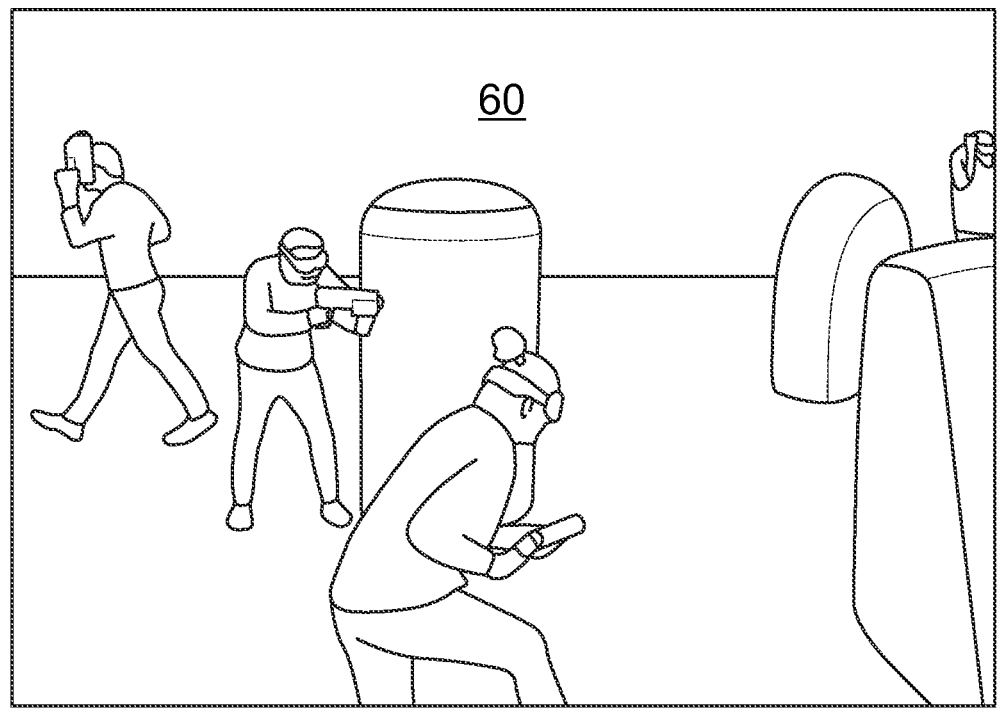
Figure 10E:
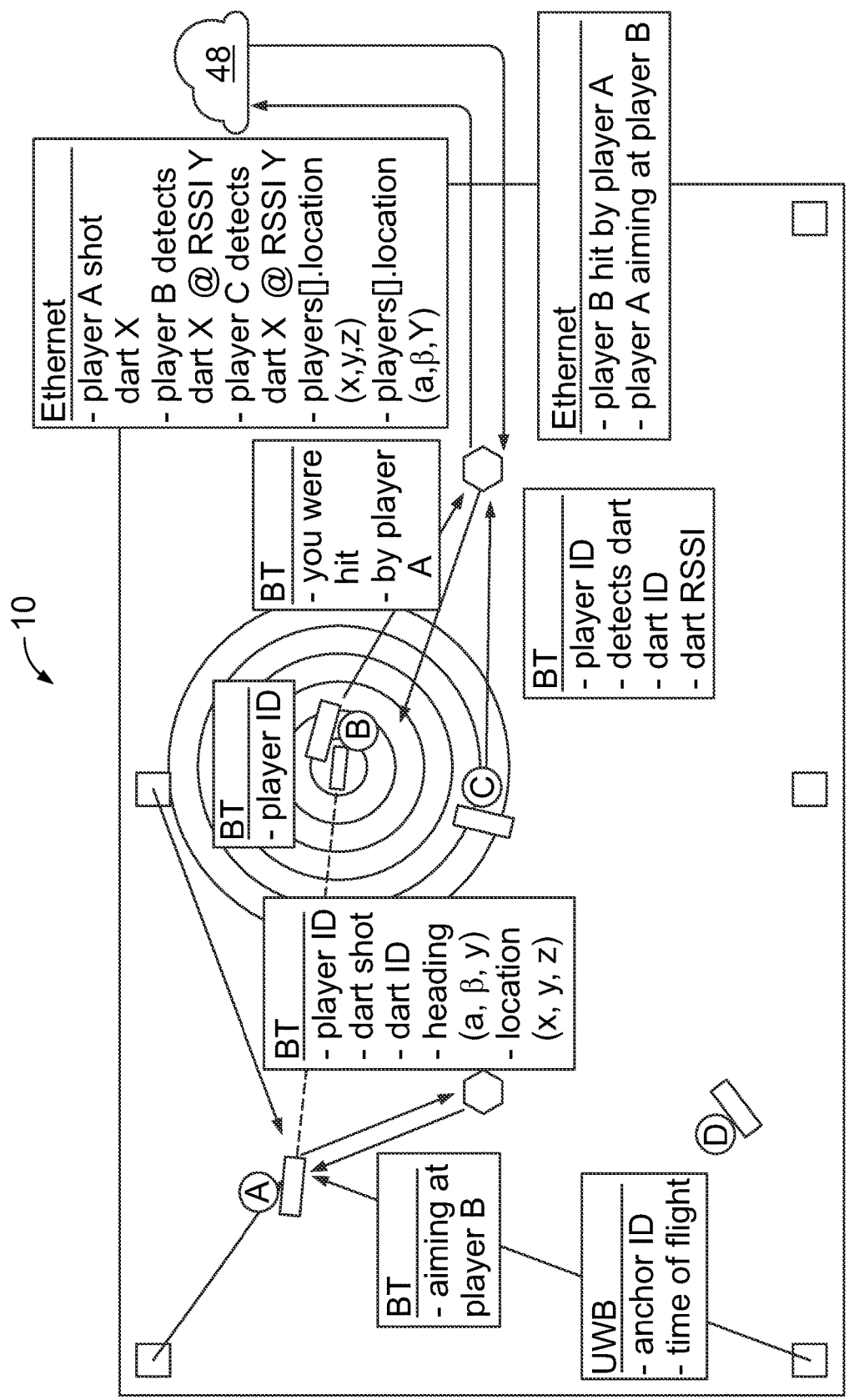

FIG. 10A illustrates Hit Detection for Cloud 48 communications messaging for time-stamped IDs sent for Hit Detection information when an encoded Dart strikes a Player Suit, dart wakes up and broadcasts ID to nearest receiver on Player blaster Sent to Cloud 48 for Players as shown, where FIG. 10B illustrates Cross-Referencing system 10 and method steps according to the aforementioned SMART DART PAIRING, TARGET AIM DETECTION, FIRING SMART DART, and HIT DETECTION respectively of FIGS. 7, 8, 9, and 10A. HIT DETECTION: (Dart Transmits ID #2799/Blaster #12 Detects Hit by Dart #2799; time-stamp 13:42:20) When encoded Dart 4 strikes suit 12, dart wakes up and broadcasts ID to nearest receiver on blaster 12 held by suit 12)—Power Level of Dart Detected. Blaster 12 receives Hit Notification—Blaster receiver to detect (short range) encoded signal; thus Blaster 12 transmits encoded ID of Dart 4 to Cloud 48 at known time and its own signal, which provides Hits information via information communicating darts 30 and blasters 40 ownership IDs.

With reference to FIG. 10B, Cross Reference is provided to support Blaster #7 HITS Suit #12, with the following four (4) Steps: (1, FIG. 8) TARGET AIM DETECTION: (Blaster #7 Aims at Suit #12; time-stamp 13:42:18, messages sent to Cloud 48 . . . ); (2, FIG. 9) FIRING SMART DART: (Blaster #7 Shoots; time-stamp 13:42:19, messages sent to Cloud 48 . . . ); (3, FIG. 10A) HIT DETECTION: (Dart Transmits ID #2799/Blaster #12 Detects Hit by Dart #2799; time-stamp 13:42:20); and (4, FIG. 7) SMART DART PAIRING: (messages sent to Cloud 48 . . . Dart ID #2799 Paired to Blaster #7), as information for Acceptable System Operation—however not All Data 1-4 are required for Commercial Operation. 1) 3 is required at a minimum to id who was hit by a dart; 2) 1 & 2 would indicate that blaster 7 was shooting dart at suit 12; 3) 4 (First in entire sequence) is just dart 4 pairing to Blaster 7 by Dart Sending ID and Blaster Receiver Detection; 4) 2 & 3 could give strong likelihood of blaster 7 shooting at certain time suit 12 was hit by a dart at certain time; 5) 3 plus suit color (In this case Dart illuminates suit of certain color associate with particular team and camera/sensor ids color and transmits that info dart ID plus detected suit color to blaster receiver to Cloud 48).

Figure 10F:
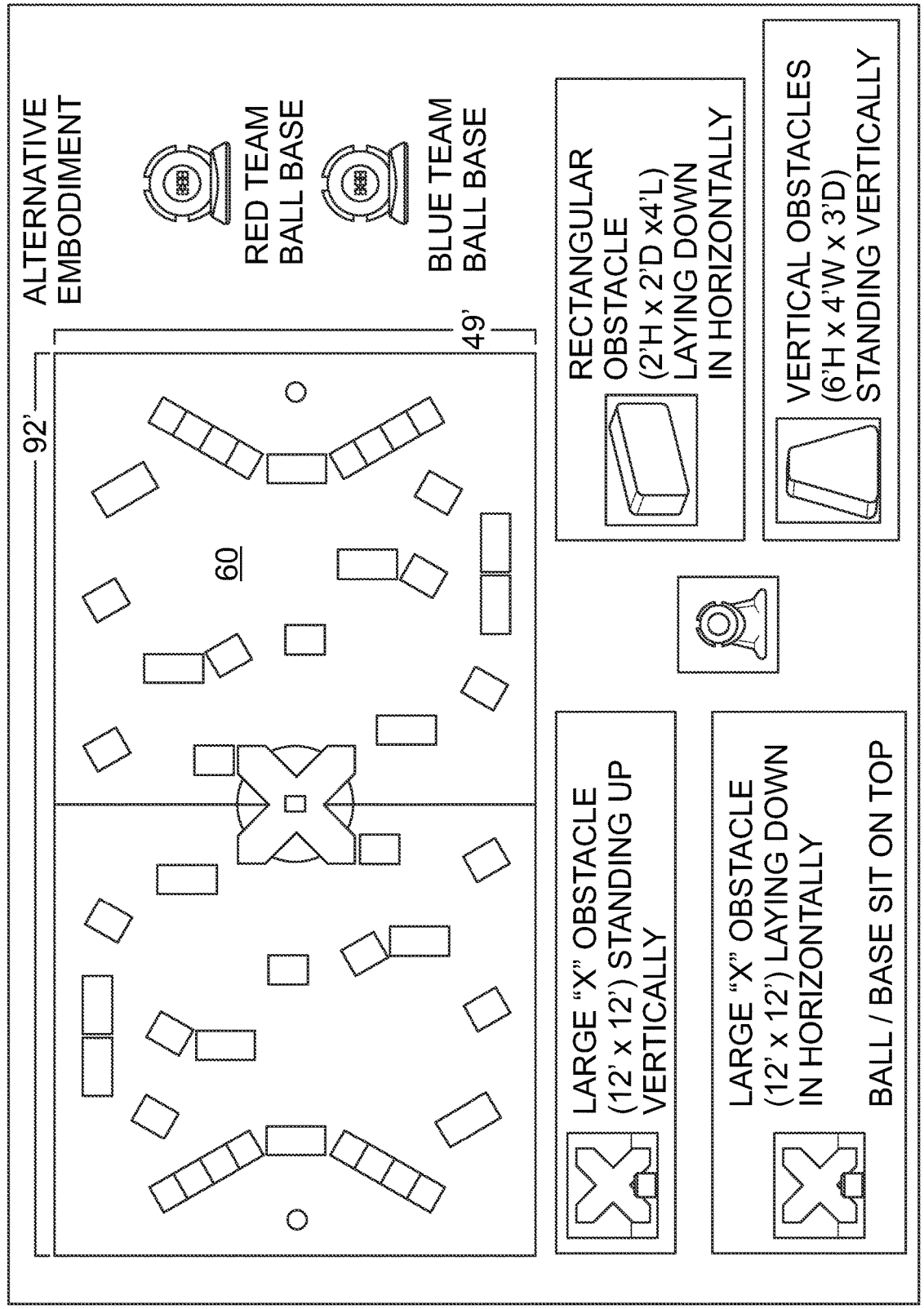
Figure 10G:
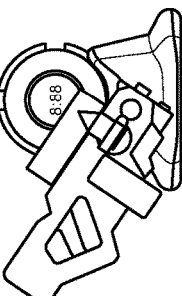
Figure 10H:
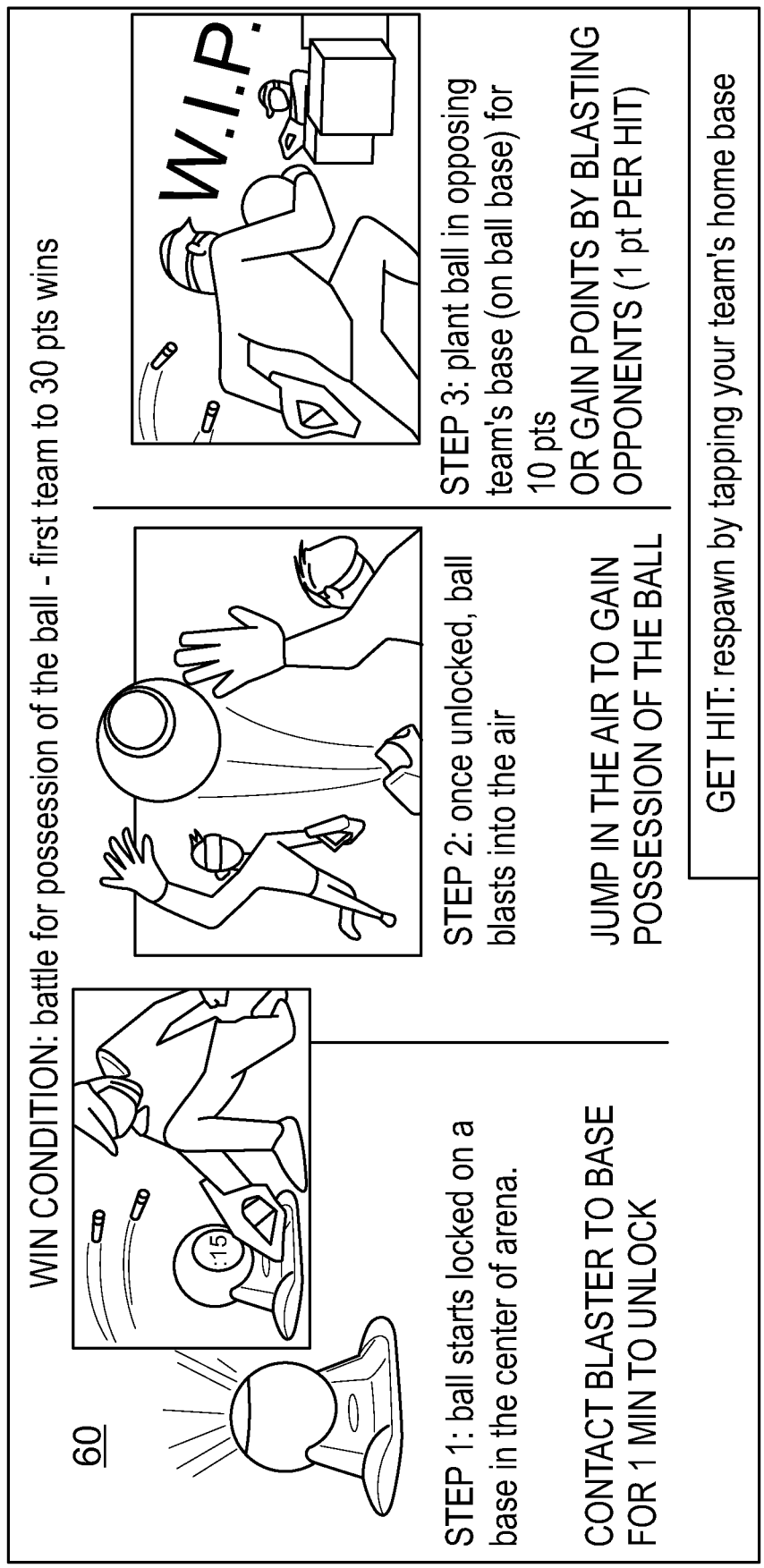

FIGS. 10C through 10F showing exemplary arena system 10, Game Mapping elevational barriers with obstacles, barriers plan gameplay toy battle environment arena. Two large beacons UWB Anchors against wall provide overall mapping of where everyone is in room and direction of shooting and angle+height. Ballistic information reduces computation time and focuses computation on likely targets and possible shooters based on only those pointing in proper direction (not hidden by a barrier). System knows location of barriers and accuracy is increased. FIGS. 10F and 10H further provide an additional embodiment where ball-play may be added to enhance the player experience, as well as the audience experience with smart dart projectile play, becomes intertwined with ball-play. The Ball can be seen as an additional peripheral, with similar electronic properties to the blaster on-board electronics, which may include: Transmitted data to the game server; gaming arena knows its field position via BLE/UWB; Data which can help enable indicators/lights to the side of the arena, to show where the ball is in the arena; Also may detect when the ball is in the end zone (and/or) goal-line detection; Receives information from the server; and Display—Data can power light-up/audio/visual display, etc.

For example two teams play progress, as follows: Teams start in designated areas on either side of arena; each team has a "goal" near their starting location; objective is to gain possession of the ball (positioned in the center of arena) and deliver to opposing team's "goal" for X amount of points; points can also be gained by getting hits (1 point per hit); where most points amount in timed round wins. Such embodiments which further employ ball play functions to enrich/help communicate gameplay to the players/audience. Examples of which include: time of round; display the shows current score; lights and sounds to help players locate; buzzer at the end of round/voice declaring winner; ability to sense when it is place into "goal"; when ball is still for X amount of time, it prompts player holding to move locations (points penalized for not moving).

FIGS. 11 through 15 are system level data flows as between Players, e.g., Player 1 Blaster and Player 2 Blaster illustrative for Player 1 and corresponding Dart perspective as to Player 2 and the arenas environments of the described embodiments supporting transferred data as described herein. The system data flows as between components are described below with diagrams of FIGS. 11 through 15 and corresponding steps therein with broken line FIGS. references to flow level data transfers in embodiments as between Players (Player 1 Blaster and Player 2 Blaster) showing data structures detail/methods of communication with the descriptive types of communications. The flow charts show the implementations of the system in increasing levels of complexity and robust embodiments for FIGS. 11 through 15 include Targeted Player Hit Resolution—Basic/No Server 100, Peer to Peer Blasters' Hit Resolution—No Server 200, Game Server Hit Resolution 300, Blaster UWB Hit Resolution 400, Blaster and Arena UWB Hit Resolution 500. The hit resolution flow with UWB data may be implemented in number of ways, as discussed including UWB arena design implementations. The flow is described with sample gameplay from User getting their blaster through a hit. The sequence after game start will occur many times in a game, with corresponding data flow.

Figure 11:
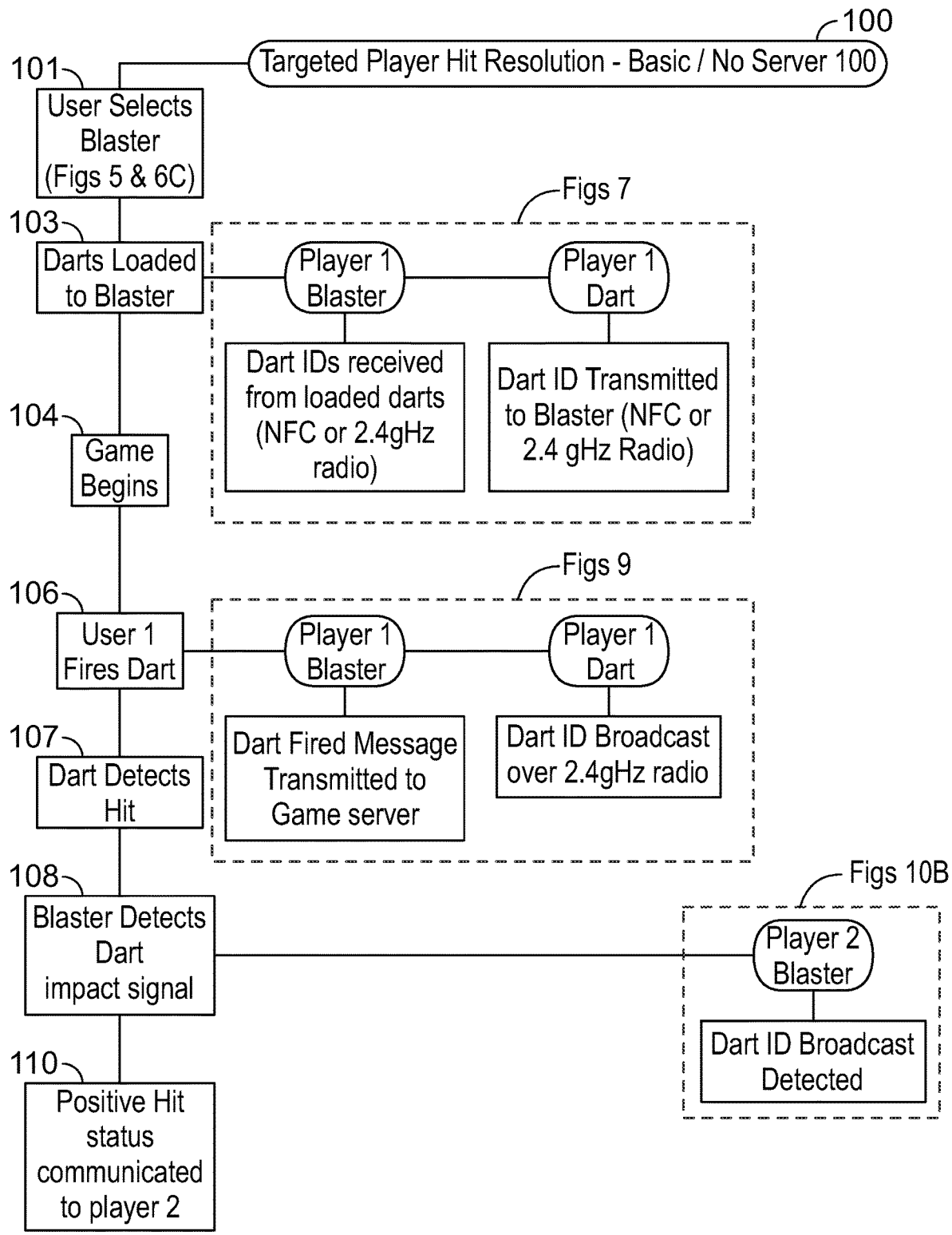
FIGS. 11 through 15 are system level data flows as between Players, e.g., Player 1 Blaster and Player 2 Blaster illustrative for Player 1 and corresponding Dart perspective as to Player 2 and the arenas environments of the described embodiments supporting transferred data as described herein in accordance with the embodiments of the present inventions.

With reference to FIG. 11, a Basic Resolution Interactive detectable projectile approach is provided without a server for Targeted Player Hit Resolution—Basic/No Server 100. This Basic Resolution represents the simplest implementation of the system. The only communication in this method is a wireless Beacon from the dart that is transmitted when a hit occurs and it transmitted if a blaster is close enough it receives the beacon and determines that player has been hit. Dart IDs are optional in this implementation but discussed below. The Targeted Player Hit Resolution—Basic/No Server 100 flow starts having Player 1 Selects Blaster 101, with next step at 103 for Player 1 Darts Loaded to Blaster where Player 1 Dart IDs are Transmitted to Blaster (via RF or other wireless communications) with Player 1 Blaster then having its Dart IDs received from loaded darts (via NFC or 2.4 gHz radio). With reference to FIG. 5 the Player wearing one of the aforementioned suits, selected Team and blaster IDs e.g. through communication capabilities, UWB, Wi-Fi to Cloud 48 and the like for Cloud 48 information messaging Team/Blaster Selection Team Join Selection facilitates messaging send for use. The Game Begins at 104, then Player 1 Fires Dart 106 with Dart ID Broadcast over 2.4 gHz radio (and optionally Dart Fired Message Transmitted to a Game server being optional in this Stand-alone blasters' embodiment). The Dart Detects Hit at 107, and the Player 2 Blaster Detects Dart impact signal 108 via the Dart ID Broadcast with Positive Hit status communicated to Player 2 at 110. As discussed, FIG. 7 facilitates the Smart Dart Pairing for communications messaging for sending Dart IDs Paired to Blaster time-stamped IDs sent for Pairing information messaging as between Players in certain embodiments, or via the Cloud 48 for other game server embodiments discussed below.

Figure 16:
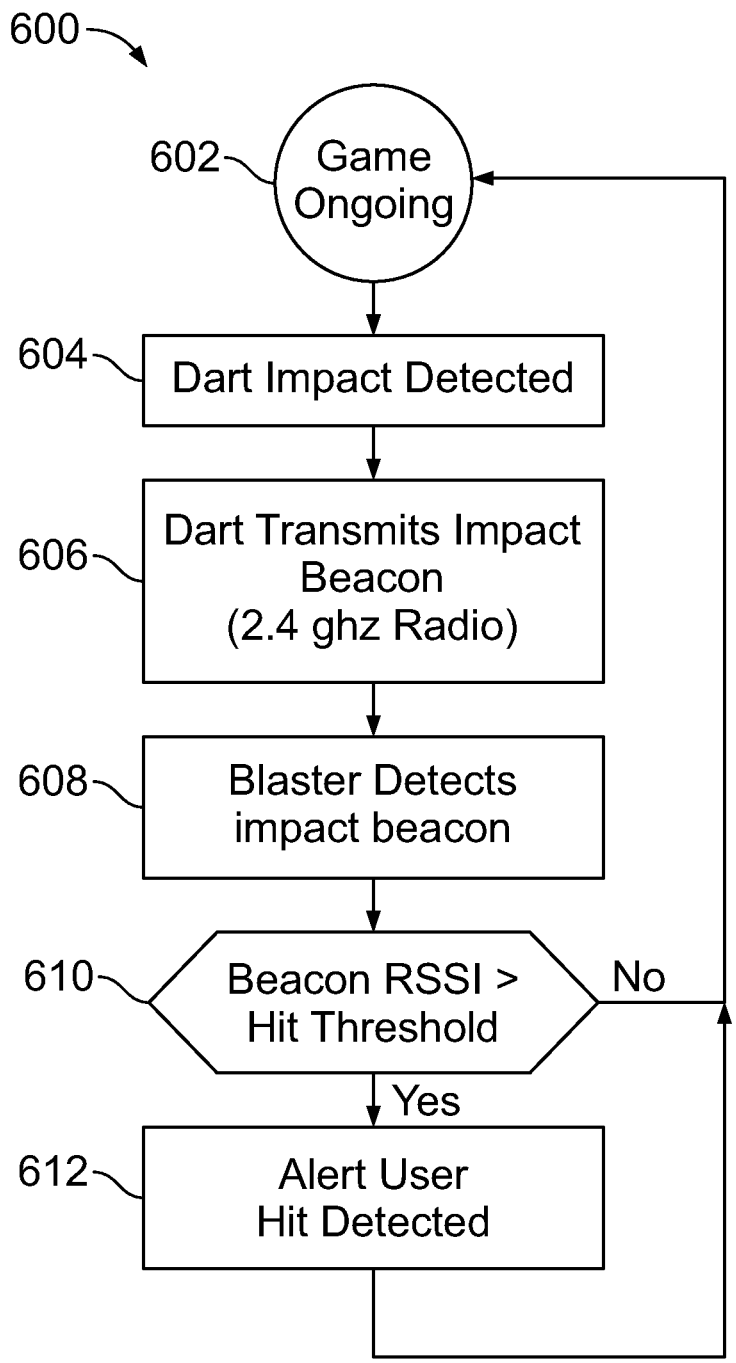
FIG. 16 illustrates supporting a Basic Resolution Interactive detectable projectile flow chart provided for Targeted Player Hit Resolution in Basic, No Server gameplay supporting Dart activity and Blaster activity determinations in accordance with the embodiments of the present inventions.

FIG. 16 illustrates supporting a Basic Resolution Interactive detectable projectile flow chart provided for Targeted Player Hit Resolution in Basic, No Server gameplay supporting Dart activity and Blaster activity determinations. With reference to FIG. 16 supporting a Basic Resolution Interactive detectable projectile flow chart is provided for Targeted Player Hit Resolution—Basic/No Server 100 for general gameplay supporting Dart activity and Blaster activity determinations without a server. In this regard, at 600, a Game Ongoing gameplay loop 602 checks for Dart Impact Detected 604, and Dart Transmits Impact Beacon 606 (via 2.4 ghz Radio) as Dart activity blocks. As Blaster Activity flow blocks continues where Blaster Detects impact beacon 608 and assesses Beacon RSSI>Hit Threshold 610 (if No flow returns to game ongoing). If Yes the Alert User Hit Detected 612 is resolved, and flow returns to game ongoing.

Figure 12:
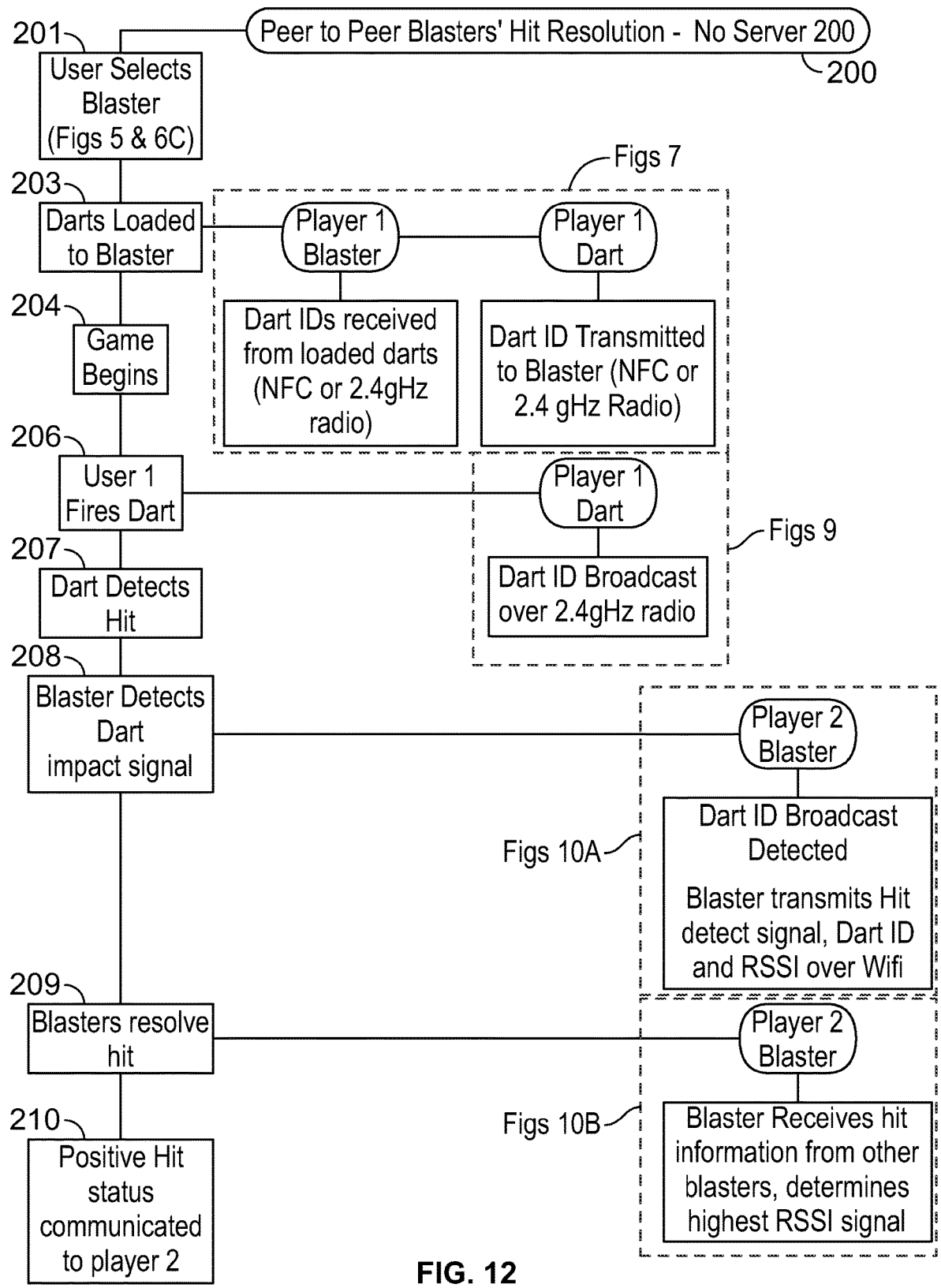

The Peer to Peer Blasters' Hit Resolution—No Server 200/No Server Peer Resolution builds on the pervious implementation by adding a method for the blasters to communicate with each other. This can help to resolve situations where there are multiple blasters within range of the dart beacon. The blasters can communicate with each other to determine which sees the strongest signal and use this to determine the most likely player that was hit. With reference to FIG. 12, Peer to Peer Blasters' Hit Resolution—No Server 200, flow starts having Player 1 Selects Blaster 201, with next step at 203 for Player 1 Darts Loaded to Blaster where Player 1 Dart IDs are Transmitted to Blaster (via RF or other wireless communications) with Player 1 Blaster then having its Dart IDs received from loaded darts (via NFC or 2.4 gHz radio). The Game Begins at 204, then Player 1 Fires Dart 206 with Dart ID Broadcast over 2.4 gHz radio (as optionally Dart Fired Message Transmitted to a Game server again optional in this Peer to Peer embodiment). The Dart Detects Hit at 207, with Dart ID Broadcast Detected Player 2 Blaster transmits Hit detect signal, Dart ID and RSSI received (signal strength information) over Wi-Fi, and Blaster Detects Dart impact signal at 208 where Blaster Receives hit information from other blasters, determines highest RSSI signal, and Blasters resolve hit 209, Positive Hit status communicated to Player 2 at 210. The RSSI and the Blaster to Blaster communications are applicable to embodiments 2-5 (signal strength threshold may also be relevant to 1 as to whether the impact indicated by signal strength is close enough as to signal hit). As discussed further below communications of RSSI and such data are extended with the Ultra-Wide Band (UWB) further embodiments discussed below.

Figure 17:
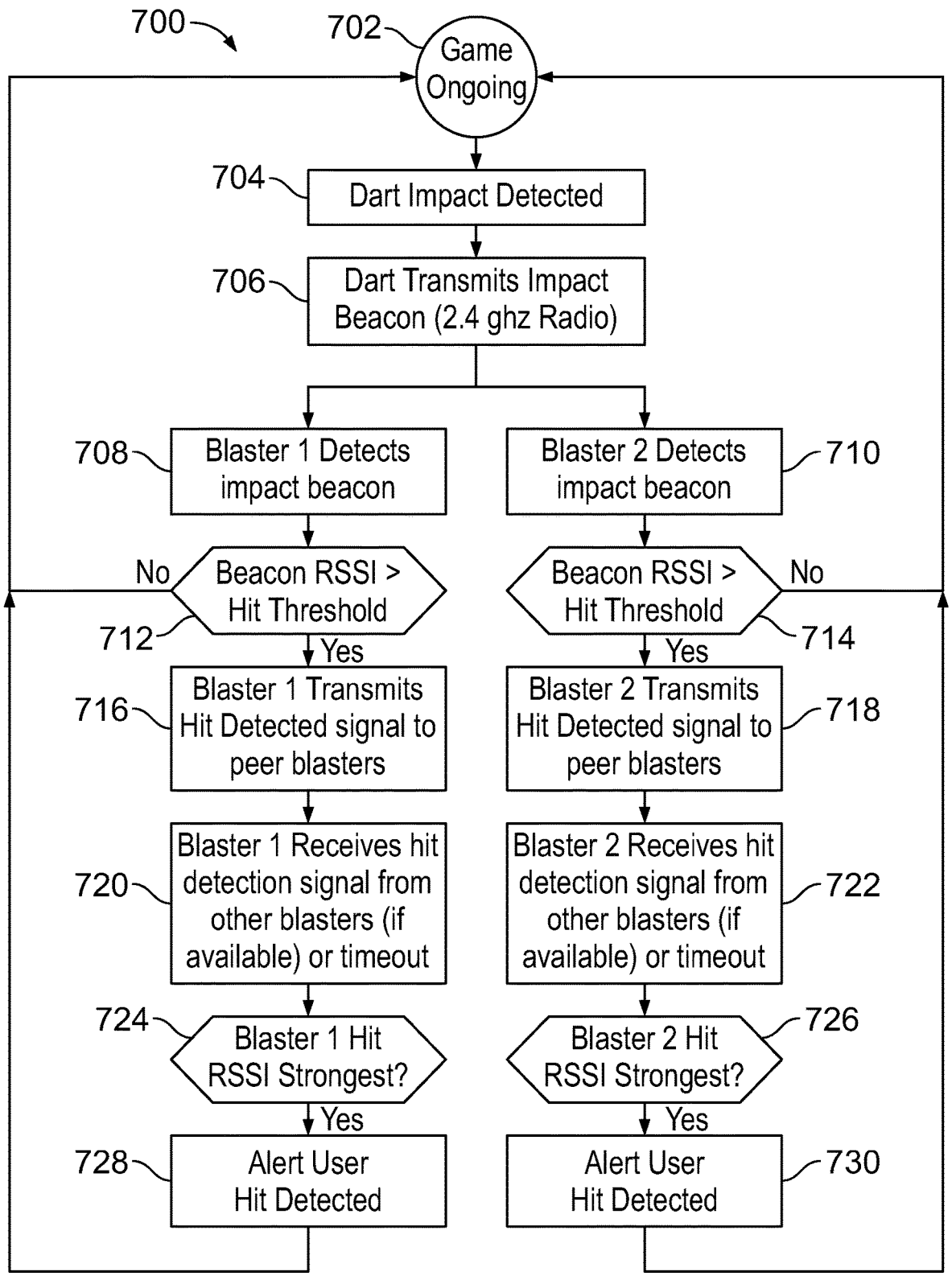
FIG. 17 illustrates supporting Peer to Peer Blasters' Hit Resolution without a server for Interactive detectable projectile flow chart support for Targeted Player Hit Resolution of Peer To Peer Resolution Dart and Blaster activity determinations gameplay in accordance with the embodiments of the present inventions.

FIG. 17 illustrates supporting Peer to Peer Blasters' Hit Resolution 700 without a server for Interactive detectable projectile flow chart support for Targeted Player Hit Resolution of Peer To Peer Resolution Dart and Blaster activity determinations gameplay. With reference to FIG. 17 supporting the Peer to Peer Blasters' Hit Resolution—No Server 200 for general gameplay Peer Resolution supporting Dart activity and Blaster activity determinations without a server. In this regard, a Game Ongoing gameplay loop 702 checks for Dart Impact Detected 704, and Dart Transmits Impact Beacon 706 (via 2.4 ghz Radio) as Dart activity blocks. As Blaster Activity flow blocks continues as between two branches, namely either: Blaster 1 Detects impact beacon 708, Blaster 2 Detects impact beacon 710, from which each Detects impact beacon and assesses Beacon RSSI>Hit Threshold 712/714 (if No flow returns to game ongoing). If Yes, the flow branches where, Blaster 1 Transmits Hit Detected signal to peer blasters 716 and/or Blaster 2 Transmits Hit Detected signal to peer blasters 718; Blaster 1 Receives hit detection signal 720 from other blasters and/or Blaster 2 Receives hit detection signal 722 from other blasters (if available) or timeout; Determine finally if Blaster 1 Hit RSSI Strongest 724 and/or Determine whether Blaster 2 Hit RSSI Strongest 726? Respectively the Alert User Hit Detected 728/730 is then resolved, and flow returns to game ongoing.

Figure 13:
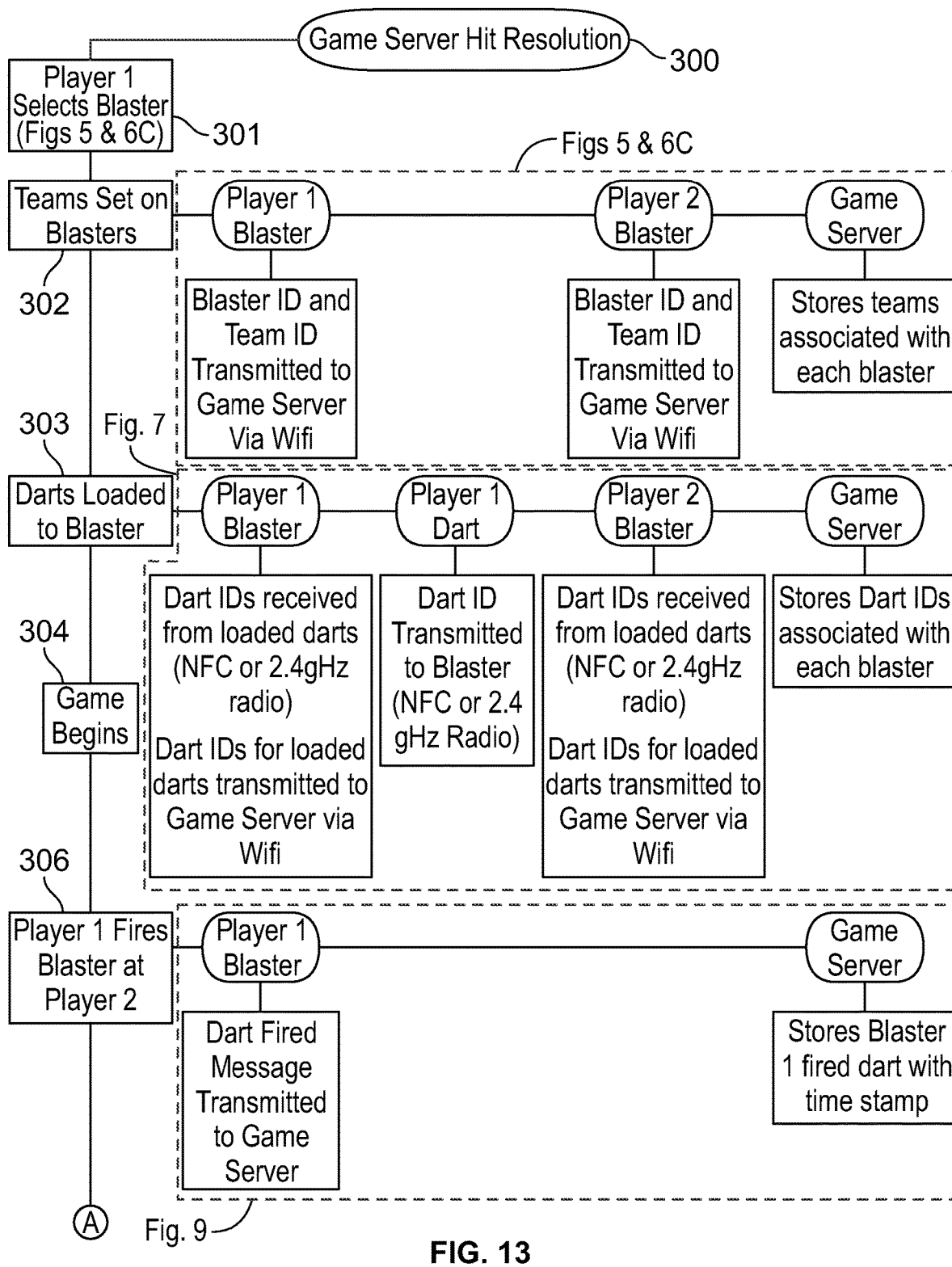
Figure 13:
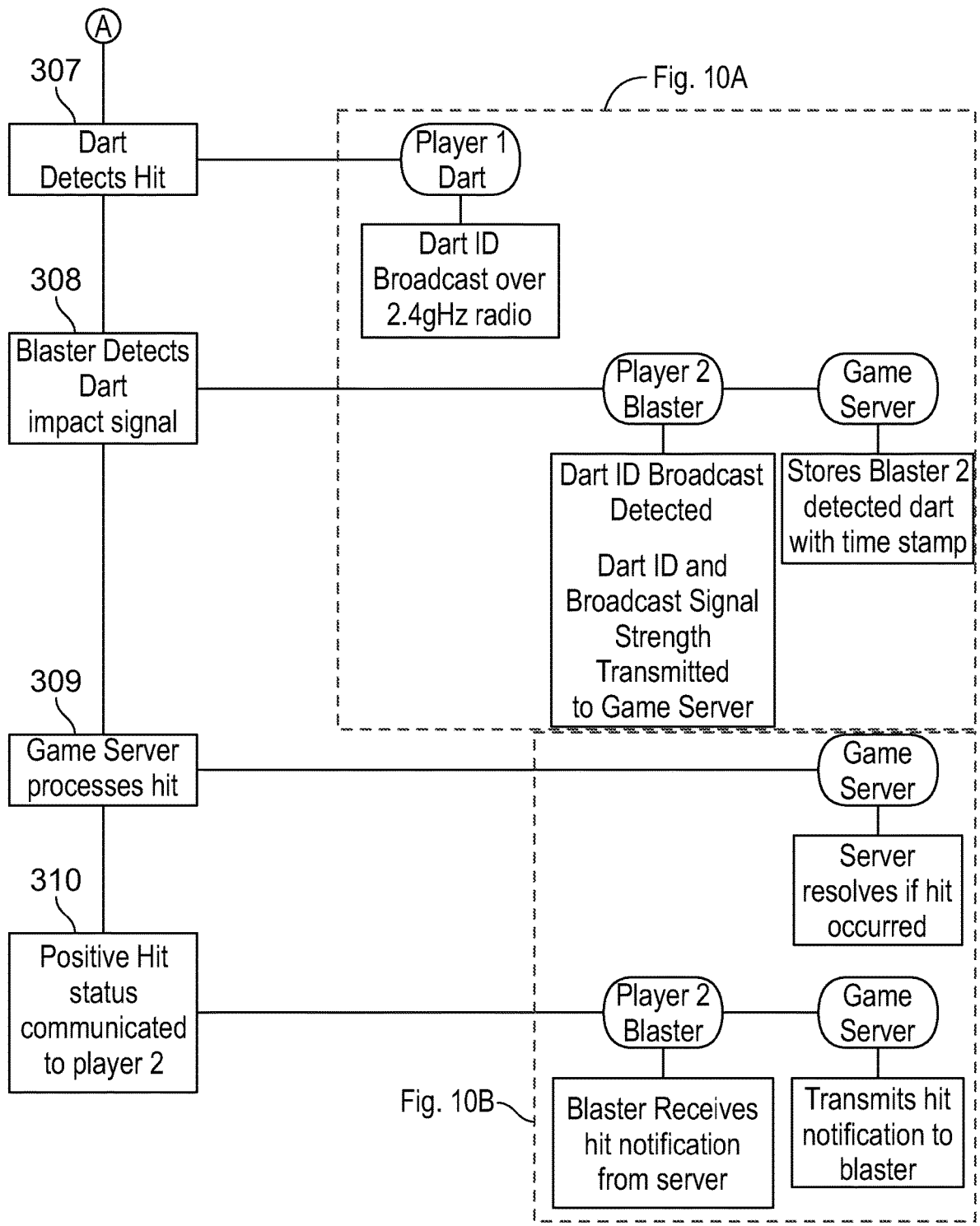

The next embodiment of the Game Server Hit Resolution 300 implementation introduces the use of the game server and includes reading all dart IDs that are loaded into a blaster. This allows the system through the game server to all darts, when they are fired and if they hit a person it is when that impact happens and identifies all blasters in the area that detect the hit and the signal strengths of the detections. This adds another dimension towards resolving who was hit and includes the ability to track hits and associate them back to the player that fired a shot. With reference to FIG. 13, Game Server Hit Resolution 300, flow starts where Player 1 Selects a Blaster at 301. The Teams Set on Blasters at 302, and Player 1 Blaster ID and Team ID are Transmitted to Game server Via Wi-Fi; Player 2 Blaster ID and Team ID are transmitted to Game server Via Wi-Fi, where the Game server Stores Teams' associated with each Blaster. Darts Loaded to Blaster 303, follow with respective flow lanes of activities as between: Player 1 Blaster, Player 1 Dart, Player 2 Blaster, and the Game server, with Player 1 Blaster. Player 1 flow provides Player 1 Darts Loaded to Blaster where Player 1 Dart IDs are received from loaded darts and Dart IDs for loaded darts transmitted to Game Server via Wi-Fi; Player 1 Dart ID Transmitted to Player 1 Blaster (via NFC or 2.4 gHz radio). At the Player 2 Blaster, Dart IDs are received from loaded darts and Dart IDs for loaded darts transmitted to Game Server via Wi-Fi. The Game server then Stores Dart IDs associated with each blaster. The Game Begins at 304, and Player 1 Fires Blaster at Player 2 at 306 with a Dart Fired Message Transmitted to Game server, where the Game server Stores Blaster 1 fired dart with time stamp. The Dart Detects Hit at 307 with Dart ID Broadcast from Player 1 Dart ID Broadcast over 2.4 gHz radio. Blaster Detects Dart impact signal at 308 where the Player 2 Blaster flow lane has Dart ID Broadcast Detected, Dart ID and Broadcast Signal Strength Transmitted to Game Server; responsively Game server Stores Blaster 2 fired dart with time stamp. The Game Server processes hit at 309 where Game Server resolves if Hit occurred. At Positive Hit status communicated to Player 2 with 310, the Player 2 Blaster Receives hit notification from server, and Game Server Transmits hit notification to blaster for communicating 310 Positive Hit status to Player 2.

This configuration incorporates the Game Server and Blaster to Blaster Communications using UWB transceivers on the blasters so that each blaster can report distance and orientation angle to other blasters in their reading area. The Game Server is able to receive updates from the blasters to the blasters in range of other blasters (Ballistic Information of distance and orientation angle) and has the ability to receive information of time stamps of darts being fired from a particular blaster and dart impact. For example if there are many players in the arena and only few players are within view of the UWB transceiver of the shooter, coupled with knowing the distance, orientation and time between shooting and hit, the computation of who shoot whom can be quickly narrowed down as between only those few players that are in view with a much higher level of accuracy than not having the ballistic information.

Beacon 812 (via 2.4 ghz Radio) as Dart activity blocks. Blaster Activity flow blocks continues where Blaster Detects impact beacon 814, and as Blaster Activity flow blocks continues a determination block 816 identifies Impact Notification, Dart ID, RSSI and Time Stamp sent to Game Server. The Server cross references 818 detections with same Dart ID, and the Server determines the impact with greatest RSSI at 820. Then, at 822 the Server sends hit notification to blaster with strongest RSSI, and at 824 the Server compares impact Dart ID to ID table and assigns credit for hit, and flow returns to the 800 Game Ongoing gameplay loop; further to gameplay loop 800 during a second Game Ongoing gameplay loop (FIG. 18C) checks for a Blaster Fired 826 determinations, from which Blaster transmits dart fired notification with time stamp to server at 828, and the Game Server stores dart fired notification 830, thus the Player Hit Detected may be resolved with dart fired and hit credit assignments notifications from Game Server embodiments.

The following supports data flows between components herein, corresponding data structures and methods of data communication types in the described embodiments of increasing levels of complexity and robustness. The hit resolution flow with UWB data may be implemented as including arena design approaches. The described gameplay flows facilitate User/players' blaster hit resolutions of the described embodiments, including but not limited to the following data communications methodologies.

| From | To | Communication method | Data |
| --- | --- | --- | --- |
| Dart (No Impact) | Blaster | NFC/2.4 gHz | Dart ID |
| Dart (On Impact) | Blaster | 2.4 gHz | Dart ID<br>Impact Beacon |
| Blaster | Blaster | 2.4 gHz | Notification of Impact<br>Impacting Dart ID<br>Impacting Dart Time Stamp |
| Blaster | Blaster | UWB | Beacon (Blaster extracts distance and angle from Time and Phase information) |
| Blaster | Server | 2.4 gHz (Wifi) | Notification of impact<br>Impacting Dart ID<br>Impacting Dart Time Stamp<br>Distance and Angle to other blasters. |
| Server | Blaster | 2.4 gHz (Wifi) | Hit Resolution |
| Blaster | Arena | UWB | Beacon arena extracts distance and angle from Time and Phase information) |
| Arena | Server | 2.4 gHz (Wifi) | Distance and angle to blasters. |

Figure 18A:
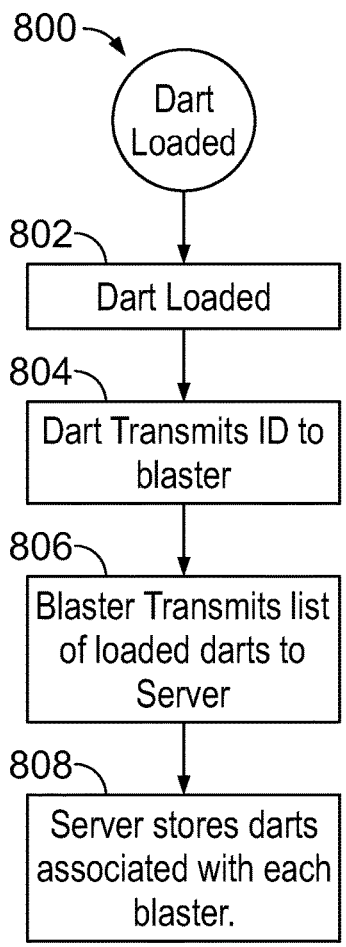
FIGS. 18A through 18C illustrate supporting Game Server Hit Resolution server embodiments Hit Resolution with a server for Interactive detectable projectile flow chart support for gameplay using Resolution from Dart activity, Blaster and Game Server Activities in accordance with the embodiments of the present inventions.
Figure 18B:
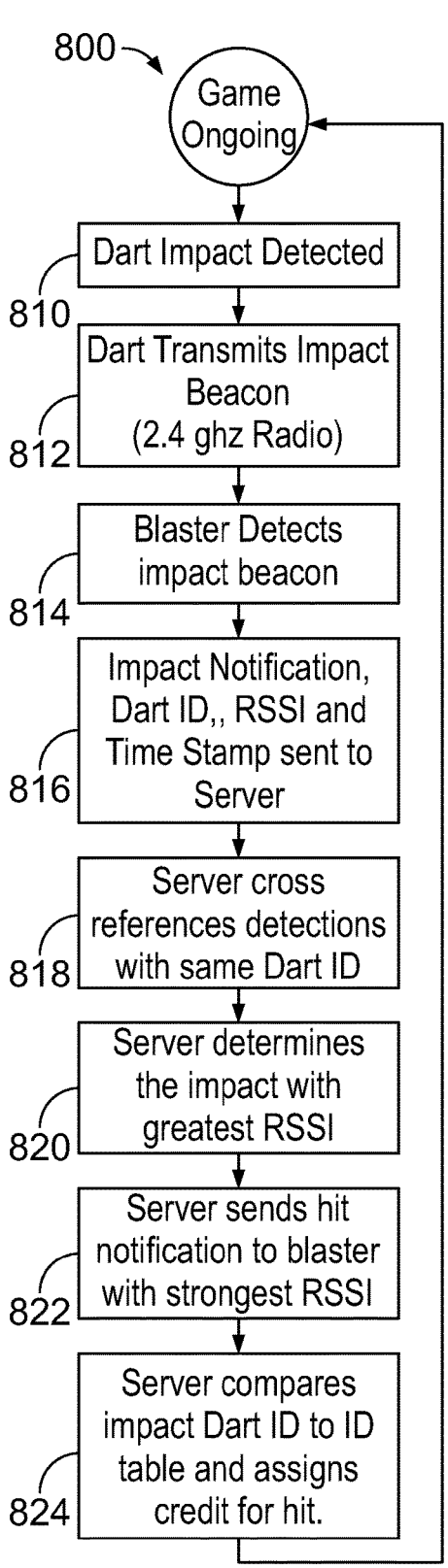
Figure 18C:
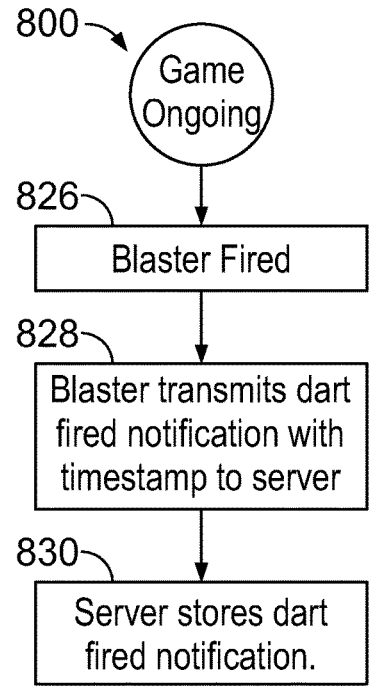

FIGS. 18A through 18C illustrate supporting Game Server Hit Resolution server embodiments Hit Resolution with a server for Interactive detectable projectile flow chart support for gameplay using Resolution from Dart activity, Blaster and Game Server Activities. With reference to FIGS. 18A, 18B, and 18C support the Game Server Hit Resolution server embodiments 800 for general gameplay using Resolution from Dart activity and Blaster activity determinations further including Game Server Activity. Thus in FIG. 18A, a Dart Loaded loop starts at 802 and checks for Loaded Darts, then 804 Transmits Dart IDs to blasters as initial Dart activity blocks, with Blaster Activity having each Blaster at 806 Transmit a list of loaded darts to the Game Server, then at 808 the Server stores darts associated with each blaster. A first Game Ongoing gameplay loop (FIG. 18B) next checks for Dart Impact Detected 810, and Dart Transmits Impact In the next two UWB Game Server embodiments 400 and 500 Blaster and Arena UWB Hit Resolutions discussed in detail, each facilitate a further step Player 1 Points Blaster at Player 2 discussed below (405 and 505) having these implementation introduce Ultra-Wide Band Transceivers into the blasters.

Figure 14:
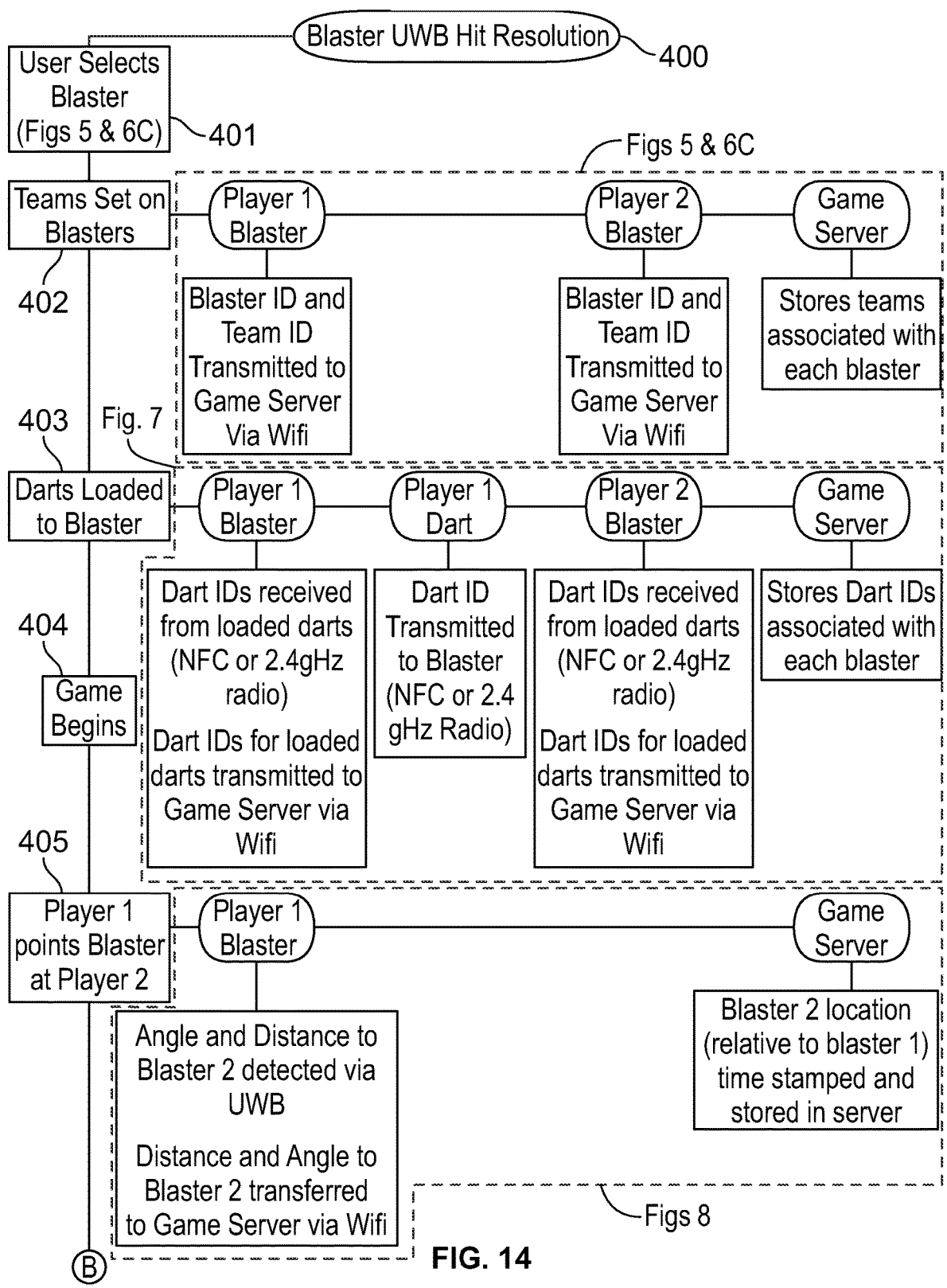
Figure 14:
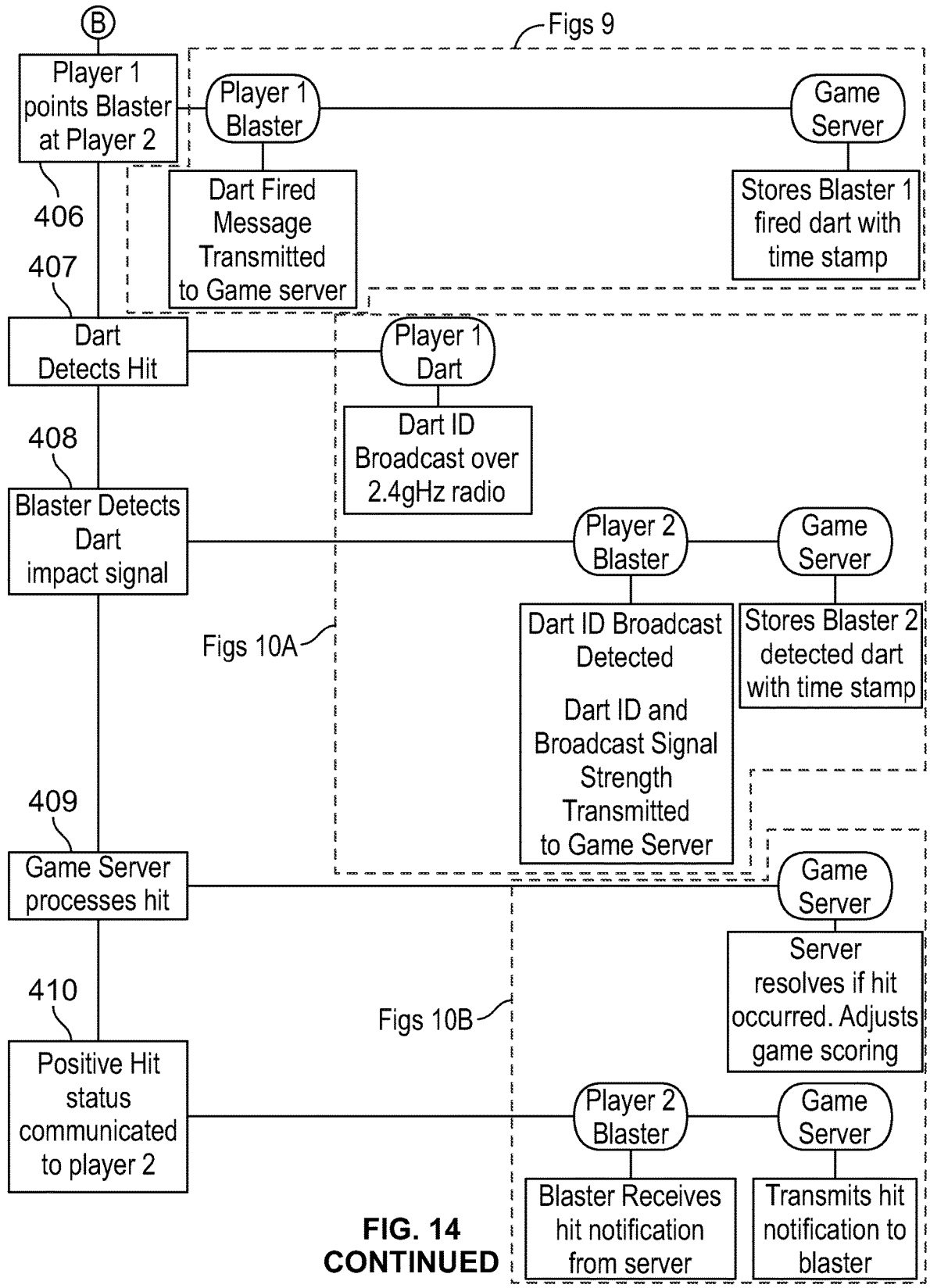

The Blaster UWB Hit Resolution 400 implementation adds Ultra-Wide Band Transceivers into the blasters. The UWB blasters report distance and orientation angle to other blasters detected in their reading area. This allows the Game server to determine the blasters in range of the blaster when fired. This information can be cross referenced with the time stamps of the dart being fired and the dart impact to help resolve the most likely person hit by a dart using ballistic calculations. With reference to FIG. 14, Blaster UWB Hit Resolution 400, flow starts where Player 1 Selects a Blaster at 401. The Teams Set on Blasters at 402, and Player 1 Blaster ID and Team ID are Transmitted to Game server Via Wi-Fi; Player 2 Blaster ID and Team ID are transmitted to Game server Via Wi-Fi, where the Game server Stores Teams' associated with each Blaster. Darts Loaded to Blaster 403, follow with respective flow lanes of activities as between: Player 1 Blaster, Player 1 Dart, Player 2 Blaster, and the Game server, with Player 1 Blaster. Player 1 flow provides Player 1 Darts Loaded to Blaster where Player 1 Dart IDs are received from loaded darts and Dart IDs for loaded darts transmitted to Game Server via Wi-Fi; Player 1 Dart ID Transmitted to Player 1 Blaster (via NFC or 2.4 gHz radio). At the Player 2 Blaster, Dart IDs are received from loaded darts and Dart IDs for loaded darts transmitted to Game Server via Wi-Fi. The Game server then Stores Dart IDs associated with each blaster. The Game Begins at 404, and in a further enabled step Player 1 Points Blaster at Player 2 at 405 and using Player 1 Blaster information concerning Angle and Distance to Blaster 2 detected via UWB, Distance and Angle to Blaster 2 transferred to Game Server via Wi-Fi facilitates the Game Server with such blaster information to use Blaster 2 location (relative to blaster 1) time-stamped and stored in Game Server to resolve player darts and hits determinations with UWB broadcast signaling. As discussed in connection with FIG. 8 Target Aim Detection for Cloud 48 communications messaging time-stamped IDs sent information messaging for Target Aim Detection information as beacon signaling information of ID Sent to Cloud 48 for Players shown in accordance with the embodiments.

Then, Player 1 Fires Blaster at Player 2 at 406 with a Dart Fired Message Transmitted to Game server, where the Game server Stores Blaster 1 fired dart with time stamp. The Dart Detects Hit at 407 with Dart ID Broadcast from Player 1 Dart ID Broadcast over 2.4 gHz radio. Blaster Detects Dart impact signal at 408 where the Player 2 Blaster flow lane has Dart ID Broadcast Detected, Dart ID and Broadcast Signal Strength Transmitted to Game Server; responsively Game server Stores Blaster 2 fired dart with time stamp. FIG. 9 illustrates Firing Smart Dart for Cloud 48 communications messaging for time-stamped IDs sent for Firing Smart Dart information of Encoded Paired Dart shot from Player Blaster at known time Sent to Cloud 48 for Players shown in accordance with the embodiments of UWB Game Server embodiments 400 and 500 Blaster and Arena UWB Hit Resolutions discussed in detail, each facilitate a further step Player 1 Points Blaster at Player 2 discussed (with block 405, and below at 505 and 506) having implementations with Ultra-Wide Band Transceivers in the blasters. The Game Server processes hit at 409, resolves if Hit occurred, and adjusts game scoring at the Game Server. At Positive Hit status communicated to Player 2 with 410, the Player 2 Blaster Receives hit notification from server, and Game Server Transmits hit notification to blaster for communicating 410 Positive Hit status to Player 2.

The Blaster and Arena UWB Hit Resolution 500 implementation further adds UWB transceivers arranged to cover the play area, these transceivers constantly report the relative positions of all players. This data in conjunction with the known locations of these transceivers allows the game server to map the locations of all players on the field at a given time. These positions can be cross referenced with time stamps of shots fired and with ballistic calculations can be used to increase the probabilities that the correct hit player is identified. The determination and mapping knowledge of all players' locations also allows for the game server to have access to advanced statistics including player activity and movement with alternate UWB/motions sensing functionalities. The Game server thus continuously receives and stores Angle and distance data to each blaster from Room UWB-calculates and stores each blaster's X, Y location based on known location of room UWB and angle and distance information. The Arena room UWB environment facilitated with the present described embodiment also continuously employs its Room UWB Transceivers to Report Angles and Distances as between each Blaster to Game server via Wi-Fi. This information may also be used in directing cameras or for other media production purposes.

Figure 15:
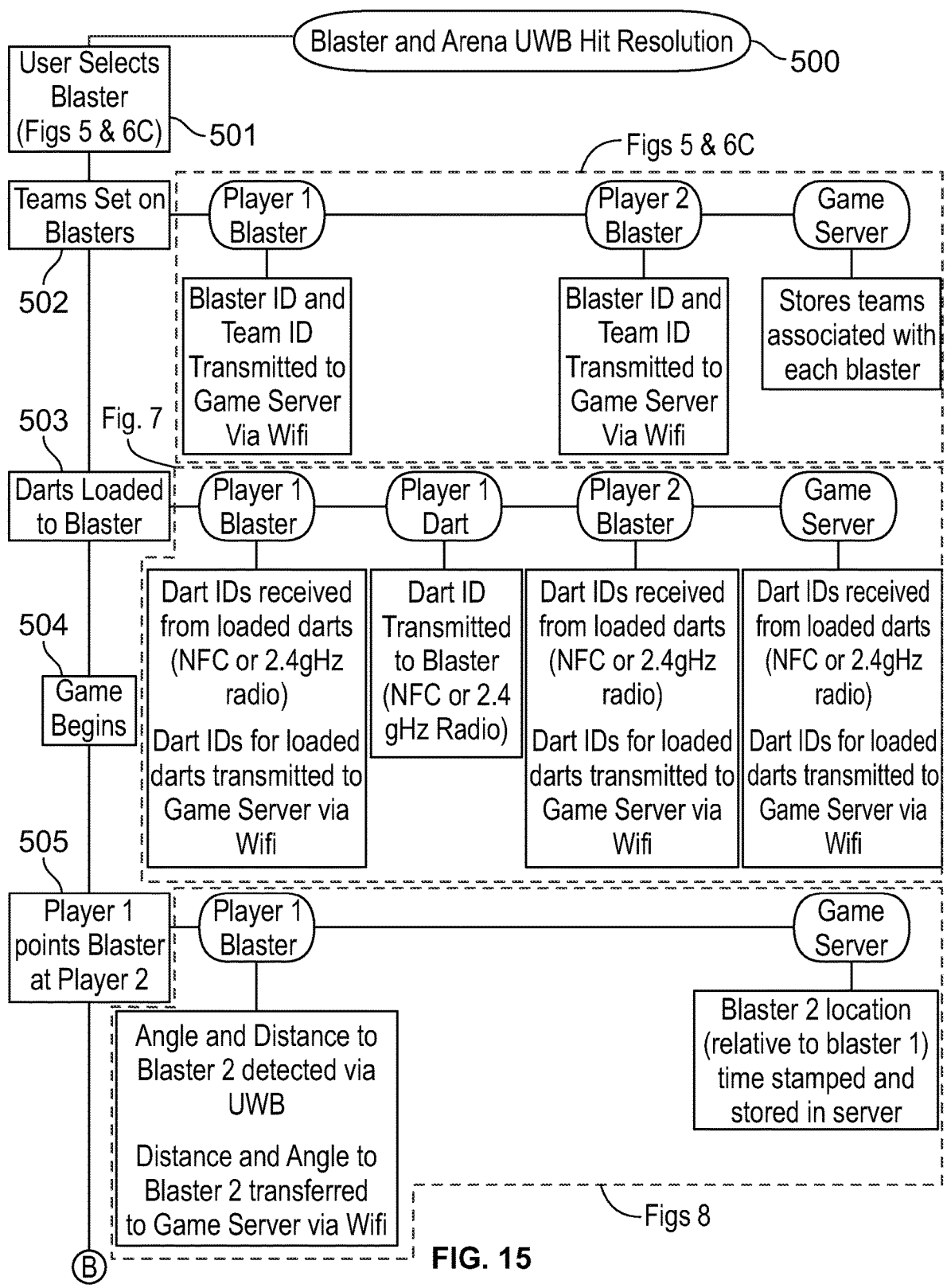
Figure 15:
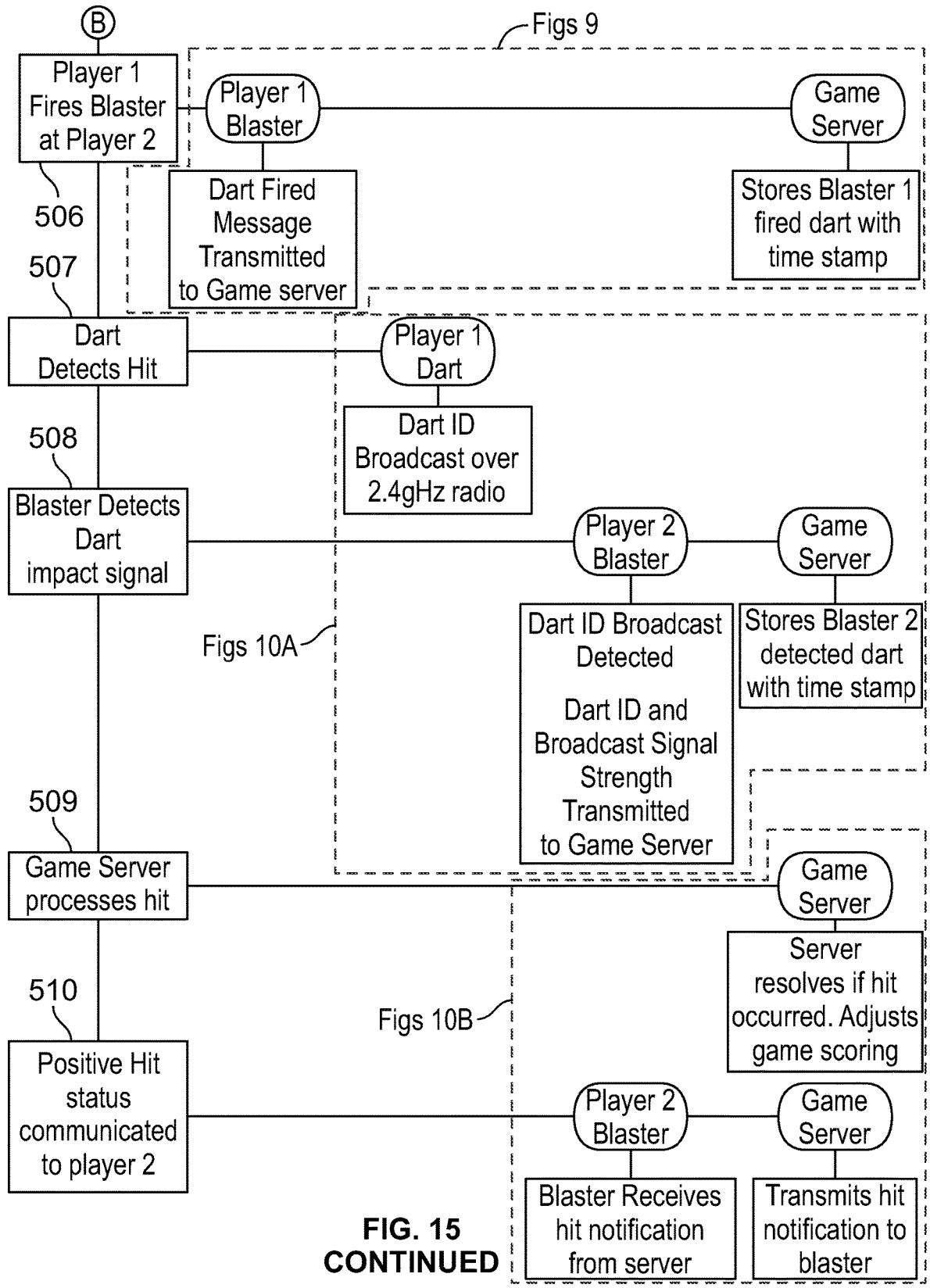

With reference to FIG. 15, Blaster and Arena UWB Hit Resolution 500, flow starts where Player 1 Selects a Blaster at 501. Also with reference to associated Figures cross referenced in the broken line blocks are relevant to each of the forgoing embodiments. With reference to the present described Blaster and Arena UWB embodiment, Teams Set on Blasters at 502, and Player 1 Blaster ID and Team ID are Transmitted to Game server Via Wi-Fi; Player 2 Blaster ID and Team ID are transmitted to Game server Via Wi-Fi, where the Game server Stores Teams' associated with each Blaster. Darts Loaded to Blaster 503, follow with respective flow lanes of activities as between: Player 1 Blaster, Player 1 Dart, Player 2 Blaster, and the Game server, with Player 1 Blaster. Player 1 flow provides Player 1 Darts Loaded to Blaster where Player 1 Dart IDs are received from loaded darts and Dart IDs for loaded darts transmitted to Game Server via Wi-Fi; Player 1 Dart ID Transmitted to Player 1 Blaster (via NFC or 2.4 gHz radio). At the Player 2 Blaster, Dart IDs are received from loaded darts and Dart IDs for loaded darts transmitted to Game Server via Wi-Fi. Dart IDs are received from loaded darts from the blasters (via NFC or 2.4 gHz radio) such that the Dart IDs for loaded darts are thus transmitted to Game Server via Wi-Fi. Then the Game Begins at 504 with the enabled Blaster and Arena UWB Hit Resolutions step of Player 1 Points Blaster at Player 2 at 505 and using Player 1 Blaster information concerning Angle and Distance to Blaster 2 detected via UWB, Distance and Angle to Blaster 2 transferred to Game Server via Wi-Fi facilitates the Game Server with such blaster information to use Blaster 2 location (relative to blaster 1) time-stamped and stored in Game Server to resolve player darts and hits determinations with UWB broadcast signaling. Then, Player 1 Fires Blaster at Player 2 at 506 with a Dart Fired Message Transmitted to Game server, where the Game server Stores Blaster 1 fired dart with time stamp. The Dart Detects Hit at 507 with Dart ID Broadcast from Player 1 Dart ID Broadcast over 2.4 gHz radio. Blaster Detects Dart impact signal at 508 where the Player 2 Blaster flow lane has Dart ID Broadcast Detected, Dart ID and Broadcast Signal Strength Transmitted to Game Server; responsively Game server Stores Blaster 2 fired dart with time stamp. The Game Server processes hit at 509, resolves if Hit occurred, and adjusts game scoring at the Game Server. At Positive Hit status communicated to Player 2 with 510, the Player 2 Blaster Receives hit notification from server, and Game Server Transmits hit notification to blaster with Blaster and Arena UWB communicating Positive Hit status to Player 2.

While the present inventions have been illustrated by a description of various toy battle dart shooting gameplay environments supporting players' dart projectile hits or tags with detectable projectile devices and while these embodiments have been set forth in considerable detail, it is intended that the scope of the inventions be defined by the appended claims. It will be appreciated by those skilled in the art that modifications to the foregoing preferred embodiments may be made in various aspects. It is deemed that the spirit and scope of the inventions encompass such variations to be preferred embodiments as would be apparent to one of ordinary skill in the art and familiar with the teachings of the present application.

What is claimed is:

1. A system for resolving hits to a targeted player from a toy projectile during gameplay, comprising:
    a first conductive suit for being worn by a first player;
    a second conductive suit for being worn by the targeted player;
    one or more of the toy projectiles;
    a first player projectile launcher for receiving and launching the toy projectiles for use by the first player;
    said toy projectiles each comprising:
        a memory,
        an electrical energy storage element,
        a projectile beacon transmitter, and
        a conductive projectile tip, the memory being encoded with first player projectile launcher identifying information when said first player projectile launcher receives the toy projectiles, the projectile tip being conductive with the second conductive suit upon contact therewith; and
    a targeted player projectile launcher having a projectile beacon receiver responsive to the first player projectile launcher identifying information from the projectile beacon transmitter; and
    the targeted player projectile launcher having a targeted player information processor including a targeted player launcher transmitter for communicating the projectile tip contact with the second conductive suit as a targeted player hit from the first player projectile launcher.

2. The system for resolving hits as recited in claim 1, wherein the first player projectile launcher comprises a first player information processor and a first player launcher transmitter for communicating the use by the first player for launching the toy projectiles to contact with the second conductive suit, the system for resolving hits further comprising a game server in communication with the first player information processor and the targeted player information processor, with the game server receiving communication from the first player launcher transmitter communicating the use of the first player projectile launcher for launching the one or more toy projectiles, the game server further in communication with the targeted player information processor through the targeted player transmitter to communicate the targeted player hit, wherein the game server resolves the targeted player hit as being one or more of the launched toy projectiles from the use of the first player projectile launcher.

3. The system for resolving hits as recited in claim 1, comprising a targeted player beacon signal transmitter for transmitting targeted player projectile launcher identifying information of the targeted player projectile launcher.

4. The system for resolving hits as recited in claim 3, wherein the first player projectile launcher further comprises a targeted player beacon signal receiver for receiving the targeted player beacon signal including the targeted player projectile launcher identifying information.

5. The system for resolving hits as recited in claim 1, further comprising a first player information processor, a first player launcher transmitter, and a game server in communication with the first player projectile launcher and the targeted player projectile launcher.

6. The system for resolving hits as recited in claim 5, wherein the game server communicates with the targeted player projectile launcher information processor to communicate the targeted player hit.

7. The system for resolving hits as recited in claim 5, further comprising Ultra-Wide Band Transceivers in each of said first player projectile launcher and said targeted player projectile launcher, each of which are in communication with the game server.

8. The system for resolving hits as recited in claim 7, wherein the game server communicates with the first player projectile launcher to receive first player projectile launcher information including launch time, range and orientation angle reports for the toy projectile launched from said first player projectile launcher.

9. The system for resolving hits as recited in claim 8, wherein the game server communicates with the targeted player projectile launcher information processor to communicate the targeted player hit.

10. The system for resolving hits as recited in claim 5, further comprising an arena defined to include an arena information processor and an arena Ultra-Wide Band Transceiver for gameplay within the arena, said arena Ultra-Wide Band Transceiver in communication with the game server and each of said first player projectile launcher.

11. The system for resolving hits as recited in claim 10, wherein the arena Ultra-Wide Band Transceiver is in communication with the first player projectile launcher to receive first player projectile launcher information including launch time, range and orientation angle reports for the toy projectile launched from said first player projectile launcher.

12. The system for resolving hits as recited in claim 11, wherein the Ultra-Wide Band Transceiver communicates the launch time, range and orientation angle reports for the toy projectile launched from said first player projectile launcher to the arena information processor.

13. The system for resolving hits as recited in claim 11, wherein the arena Ultra-Wide Band Transceiver communicates with the targeted player projectile launcher information processor.

14. The system for resolving hits as recited in claim 1, wherein the conductive projectile tip comprises a charging circuit operative with the first player projectile launcher for charging the electrical energy storage element.

* * * * *